(12) United States Patent
Morishima et al.

(10) Patent No.: US 6,306,947 B1
(45) Date of Patent: Oct. 23, 2001

(54) PRINTING INK AND PAINT COMPOSED OF AN AQUEOUS EMULSION OF SELF-EMULSIFIABLE URETHANE COPOLYMER

(75) Inventors: Takeshi Morishima; Shunsuke Murakami; Toshiaki Sasahara, all of Yokohama; Shin Konishi, Fujisawa; Kazuya Sugimoto, Washimiya-machi, all of (JP)

(73) Assignees: Nippon Polyurethane Industry Co., Ltd.; Asia Industry Co., Ltd., both of Tokyo (JP)

( * ) Notice: Subject to any disclaimer, the term of this patent is extended or adjusted under 35 U.S.C. 154(b) by 0 days.

(21) Appl. No.: 09/320,718

(22) Filed: May 27, 1999

(51) Int. Cl.$^7$ ................ C08F 261/08; C08F 261/10; C08F 291/12; C08F 299/06; C08J 3/03
(52) U.S. Cl. ............ 524/457; 524/589; 524/592; 524/597; 524/598; 524/839; 525/453; 525/455; 525/456; 525/920
(58) Field of Search ................ 524/542, 591, 524/839, 457, 589, 592, 598, 597; 525/455, 920, 453, 456

(56) References Cited

U.S. PATENT DOCUMENTS

| | | | |
|---|---|---|---|
| 5,556,912 | * 9/1996 | Brock et al. | 524/507 |
| 5,691,425 | * 11/1997 | Klein et al. | 525/455 |
| 6,069,217 | * 5/2000 | Nae et al. | 526/301 |

FOREIGN PATENT DOCUMENTS

| | | |
|---|---|---|
| 59138210 | 8/1984 | (JP) . |
| 59210978 | 11/1984 | (JP) . |
| 3244611 | 10/1991 | (JP) . |
| 5339542 | 12/1993 | (JP) . |
| 7228829 | 8/1995 | (JP) . |
| 7233347 | 9/1995 | (JP) . |
| 8165318 | 6/1996 | (JP) . |
| 9025324 | 1/1997 | (JP) . |

\* cited by examiner

*Primary Examiner*—David W. Wu
*Assistant Examiner*—Kelechi Egwim
(74) *Attorney, Agent, or Firm*—Browdy and Neimark

(57) ABSTRACT

An aqueous emulsion which comprises as a resin component a self-emulsifiable copolymer in which at least one ethylenically unsaturated monomer and at least one urethane prepolymer having at least one mercapto group and at least one hydrophilic, polar group are bonded by radical polymerization or in which at least one ethylenically unsaturated monomer, at least one organic polyisocyanate, at least one compound having at least one mercapto group and at least one active hydrogen-containing group and at least one compound having at least one hydrophilic, polar group and at least one active hydrogen-containing group are bonded by urethanization reaction and radical polymerization. The aqueous emulsion is better in storage stability than conventional ones.

8 Claims, No Drawings

PRINTING INK AND PAINT COMPOSED OF AN AQUEOUS EMULSION OF SELF-EMULSIFIABLE URETHANE COPOLYMER

BACKGROUND OF THE INVENTION

1. Field of the Invention

This invention relates to an aqueous emulsion comprising a self-emulsifiable copolymer which is rich in flexibility, tough and excellent in durability; a process for producing the same; and an aqueous paint and aqueous printing ink comprising the same.

2. Related prior art

Organic solvent-containing paints and printing inks have problems with safety and hygiene such as an unhealthy effect by inhalation of organic solvent vapors, explosion, fire and the like, and environmental problems such as air pollution and the like, so that the development of aqueous systems has recently been actively conducted.

In an aqueous paint, there has heretofore been used aqueous acrylic emulsions which are good in weather resistance and gloss. However, aqueous acrylic emulsions are disadvantageous in that the adhesion to a substrate and the flexibility of coating film are inferior. For overcoming these disadvantages, an attempt has been made to introduce a polyurethane skeleton excellent in elasticity and adhesiveness into the acrylic component.

For example, JP-A-59-138,210 proposes a method for polymerizing a vinylic monomer in an aqueous polyurethane.

JP-B-3-79,392 proposes a method for blending a polyether urethane with an aqueous acrylic resin.

Japanese Patent 2,641,955 proposes an aqueous resin composition obtained by polymerizing a water-soluble monomer having an $\alpha,\beta$-unsaturated double bond using a thiol group-containing thiourethane resin as a chain transfer agent and then subjecting the resulting polymer to salt-formation or quaternization with an alkali to make the polymer aqueous.

JP-A-5-339,542 proposes a method in which an anionic, aqueous polyurethane emulsion in which a hydrazide compound is used as a neutralizing agent is blended with a keto group-containing acrylic emulsion and the resulting blend is subjected to cross-linking reaction during the formation of a coating film.

JP-A-7-228,829 proposes a method in which an aqueous polyurethane emulsion containing a hydrazide group is blended with a keto group-containing acrylic emulsion and the resulting blend is subjected to cross-linking reaction during the formation of a coating film.

JP-A-7-233,347 proposes an aqueous binder which is self-cross-linkable and composed of a polyhydrazide and a carbonyl group-containing urethane-vinyl hybrid polymer. This urethane-vinyl hybrid polymer is produced by subjecting to free radical-initiated polymerization an ionic and/or non-ionic, stabilized polyurethane macromonomer having terminal and/or side vinyl groups and other functional and non-functional vinyl monomers having carbonyl groups.

JP-A-8-165,318 proposes a method for copolymerizing an aqueous polyurethane having a polymerizable, unsaturated group with a vinylic monomer.

JP-A-9-25,324 discloses a method for producing an acryl-urethane copolymer in which a urethane prepolymer having a mercapto group is used as a chain transfer agent.

However, each of the above methods has the following disadvantages:

In the methods described in JP-A-59-138,210 and JP-B-3-79,392, the acrylic emulsion and the polyurethane emulsion are merely physically mixed and not bonded with each other. Acrylic resin and urethane resin are have poor compatibility, so that it follows that haze is caused on the coating film obtained (haze increases).

In the aqueous resin composition described in Japanese Patent 2,641,955, a hydrophilic, polar group is present in only the acrylic segment and is not introduced into the thiourethane portion. Therefore, in order to allow the whole resin to have a water-dispersibility, many hydrophilic, polar groups must be introduced. If so, the coating film formed therefrom becomes insufficient in water resistance.

According to the method described in JP-A-5 25 339,542, the acrylic component and the urethane component in the coating film are bonded through the hydrazide compound which is the neutralizing agent. However, in the emulsion state, the urethane resin and the acrylic resin are merely blended and since the urethane resin and the acrylic resin have poor compatibility, it follows that haze is caused on the coating film obtained (haze increases).

According to the method described in JP-A-7 228,829, in the coating film the urethane resin and the acrylic resin are bonded by the reaction between the hydrazide group in the urethane resin and the carbonyl group in the acrylic resin. However, in the emulsion state, the urethane resin is merely blended with the acrylic resin, and since the urethane resin and the acrylic resin have poor compatibility, it follows that haze is caused on the coating film obtained (haze increases).

In the aqueous binder described in JP-A-7-233,347 and the method described in JP-A-8-165,318, no chain transfer agent is used in the course of the resin production and hence a polyurethane resin having at least two ethylenically unsaturated double bonds in one molecule is produced, so that when it is copolymerized with a vinylic monomer, gelation occurs. Therefore, in the formation of a coating film, fusion between particles is inhibited and the appearance of coating film is poor.

The acryl-urethane copolymer described in JP-A-9-25, 324 cannot be applied to an aqueous system.

Moreover, in the conventional aqueous printing inks, there is none which adheres to both polar substrates such as polyethylene terephthalate (PET) or nylon (NY) and non-polar substrates, for example, a polyolefin such as polyethylene (PE), polypropylene (PP) or the like.

In order to reduce the above problems, as in JP-A-6-80, 930, JP-A-10-139,839 and the like, blending the acrylic resin with the urethane resin and copolymerization of the starting monomers of these resins have been examined.

However, according to the method described in JP-A-6-80,930, an acrylic resin is produced in a polyurethane emulsion, and hence, fundamentally, the urethane resin and the acrylic resin are only mixed. The acrylic resin and the urethane resin have poor compatibility, and hence the adhesiveness of a print film after water has been driven off tends to become inferior. Moreover, in the method described in JP-A-10139,839, no chain transfer agent is used in the course of the resin production and hence a polyurethane resin having at least two ethylenically unsaturated double bonds in one molecule is produced, so that when it is copolymerized with a vinylic monomer, gelation tends to occur.

An object of this invention is to provide an aqueous emulsion containing a self-emulsifiable copolymer which can form a coating film rich in flexibility, tough, excellent in durability and low in haze.

Another object of this invention is to provide a process for producing the above aqueous emulsion.

A still another object of this invention is to provide an aqueous paint in which the above aqueous emulsion is used.

A further object of this invention is to provide an aqueous printing ink excellent in adhesiveness to all substrates including polyolefin substrates, pigment dispersibility and redissolvability.

Other objects and advantages of this invention will become apparent from the following description.

SUMMARY OF THE INVENTION

According to this invention, there is provided an aqueous emulsion which comprises as a resin component a self-emulsifiable copolymer in which at least one ethylenically unsaturated monomer and at least one urethane prepolymer having at least one mercapto group and at least one hydrophilic, polar group wherein the monomer and prepolymer are bonded by radical polymerization.

According to this invention, there is further provided an aqueous emulsion which comprises as a resin component a self-emulsifiable copolymer in which (1) at least one ethylenically unsaturated monomer, (2) at least one organic polyisocyanate, (3) at least one compound having at least one mercapto group and at least one active hydrogen-containing group and (4) at least one compound having at least one hydrophilic, polar group and at least one active hydrogen-containing group are bonded by urethanization reaction and radical polymerization.

According to this invention, there is further provided a process for producing the above first aqueous emulsion, which comprises subjecting at least one organic polyisocyanate (2), at least one compound (3) having at least one mercapto group and at least one active hydrogen-containing group, and at least one compound (4) having at least one hydrophilic, polar group; and at least one active hydrogen-containing group to reaction to synthesize a urethane prepolymer having at least one mercapto group and at least one hydrophilic, polar group and subsequently subjecting the said prepolymer and at least one ethylenically unsaturated monomer (1) to radical polymerization using a radical polymerization initiator to synthesize a self-emulsifiable copolymer; and subsequently emulsifying this copolymer in water.

According to this invention, there is further provided a process for producing the above second aqueous emulsion, which comprises subjecting at least one organic polyisocyanate (2), at least one compound (3) having at least one mercapto group and at least one active hydrogen-containing group, at least one compound (4) having at least one hydrophilic, polar group and at least one active hydrogen-containing group, and at least one ethylenically unsaturated monomer (1) to radical polymerization using a radical polymerization initiator and simultaneously to urethanization reaction to synthesize a self-emulsifiable copolymer and subsequently emulsifying the copolymer in water.

According to this invention, there is further provided an aqueous paint comprising either of the above-mentioned aqueous emulsions.

According to this invention, there is further provided an aqueous printing ink comprising either of the above-mentioned aqueous emulsions.

DETAILED DESCRIPTION OF THE INVENTION

The self-emulsifiable copolymer in the aqueous emulsion of this invention has a hydrophilic, polar group introduced into at least the urethane segment. This self-emulsifiable copolymer has a structure formed by subjecting the ethylenically unsaturated double bond of the ethylenically unsaturated monomer to radical polymerization and simultaneously to urethanization reaction by the mercapto groups of a hydrophilic, polar group-containing urethane prepolymer having a mercapto group or a compound having a mercapto group and an active hydrogen-containing group which is the constituent thereof as a chain transfer agent.

The constituents of the self-emulsifiable copolymer in the aqueous emulsion of this invention are described below.

The ethylenically unsaturated monomer used in this invention includes hydrophilic, polar group-containing, ethylenically unsaturated monomers, keto group- or aldehyde group-containing ethylenically unsaturated monomers and other ethylenically unsaturated monomers. These can be used alone or in admixture of any combination. However, ethylenically unsaturated monomers (mixture) containing at least the hydrophilic, polar group-containing ethylenically unsaturated monomer or ethylenically unsaturated monomers (mixture) containing at least the keto group- or aldehyde group-containing ethylenically unsaturated monomer are preferred. Moreover, in this case, ethylenically unsaturated monomers (mixture) containing 50 to 95 mol % of other ethylenically unsaturated monomers are more preferable. As these ethylenically unsaturated monomers, more specifically, acrylic monomers or mixtures thereof with at least one other ethylenically unsaturated monomer are preferable in view of compatibility with water and urethane resins, and the like. These monomers may be used alone or in admixture of two or more.

In this invention, in order to impart a self-emulsifiability to the copolymer obtained, a hydrophilic, polar group is introduced into at least the urethane segment. However, the introduction of the hydrophilic, polar group into both acrylic segment and urethane segment is preferred to the introduction into any one thereof because in the former, a self-emulsifiability can be imparted to the copolymer by introducing a smaller amount of the hydrophilic, polar group than in the latter.

The hydrophilic, polar group-containing ethylenically unsaturated monomer includes oxyethylene group-containing ethylenically unsaturated monomers, for example, poly(oxyalkylene) ether glycol monoacrylates, poly(oxyalkylene) ether glycol monomethacrylates, poly(oxyalkylene) ether glycol monoalkyl ether acrylates, poly(oxyalkylene) ether glycol monoalkyl ether methacrylates, compounds prepared by adding an alkylene oxide to a compound having an epoxy group and an ethylenically unsaturated double bond such as glycidyl acrylate, glycidyl methacrylate and the like, poly(oxyethylene) chain-containing ethylenically unsaturated monomers such as compounds represented by the formula 1 and the like, etc.; acid-containing ethylenically unsaturated monomers, for example, carboxyl group-containing ethylenically unsaturated monomers such as acrylic acid, methacrylic acid, maleic acid, maleic anhydride, maleic acid monoesters, fumaric acid, fumaric acid monoesters, itaconic acid, itaconic acid monoesters and the like, sulfonic acid group-containing ethylenically unsaturated monomers such as sulfonated styrene, sulfonated α-methylstyrene, compounds represented by the following formulas 2 and 3 and the like; base-containing ethylenically unsaturated monomers, for example, allylamine, N,N-dimethylaminoethyl acrylate, N,N-dimethylaminoethyl methacrylate, N,N-diethylaminoethyl acrylate, N,N-diethylaminoethyl methacrylate, those having added thereto an alkylene oxide, primary, secondary or tertiary amino group-containing ethylenically unsaturated monomers such as compounds represented by the formula 4 and the like, etc.:

(formula 1)

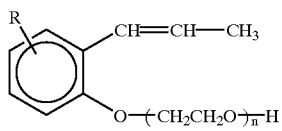

wherein R represents a hydrogen atom or a hydrocarbon group and n is an integer of 1 to 300.

(formula 2)

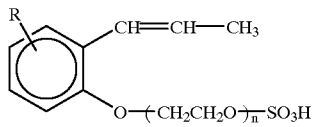

wherein R represents a hydrogen atom or a hydrocarbon group and n is an integer of 1 to 300.

(formula 3)

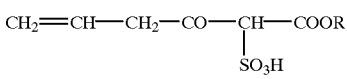

wherein R represents a hydrogen atom or a hydrocarbon group.

(formula 4)

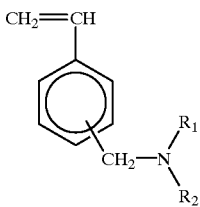

wherein $R_1$ and $R_2$ are different from or the same as each other and each represents a hydrogen atom or a hydrocarbon group.

The keto group- or aldehyde group-containing ethylenically unsaturated monomer includes acrolein, diacetone acrylamide, diacetone methacrylamide, formylstyrol, vinyl methyl ketone, vinyl ethyl ketone, vinyl butyl ketone, vinylacetophenone, vinylbenzophenone, acryloxypropenal, diacetone acrylate, acetonitrile acrylate, 2-hydroxypropyl acrylate acetylacetate, butanediol1,4-acrylate acetylacetate, methacryloxypropenal, diacetone methacrylate, acetonitrile methacrylate, 2-hydroxypropyl methacrylate acetylacetate, butanediol-1,4-methacrylate acetylacetate and the like.

The other ethylenically unsaturated monomers include acrylic acid esters such as alkyl acrylates, cycloalkyl acrylates, phenyl acrylate, benzyl acrylate, glycidyl acrylate and the like; methacrylic acid esters such as alkyl methacrylates, cycloalkyl methacrylates, phenyl methacrylate, benzyl methacrylate, glycidyl methacrylate and the like; vinyl ester compounds such as vinyl acetate, vinyl propionate and the like; vinyl ether compounds, for example, vinyl alkyl ethers such as vinyl methyl ether and the like, vinyl cyclohexyl ether, vinyl phenyl ether, vinyl benzyl ether, vinyl glycidyl ether and the like; vinyl cyanide compounds such as acrylonitrile, methacrylonitrile and the like; ethylenically unsaturated double bond-containing aromatic compounds such as styrene, vinyltoluene, α-methylstyrene and the like; vinyl halides such as vinyl chloride, vinyl bromide and the like; vinylidene halides such as vinylidene chloride, vinylidene bromide and the like; maleic acid diesters such as dialkyl maleates and the like; fumaric acid diesters such as dialkyl fumarates and the like; itaconic acid diesters such as dimethyl itaconate and the like; dialkylacrylamides such as N,N-dimethylacrylamide and the like; heterocyclic vinyl compounds such as N-vinylpyrrolidone, 2-vinylpyridine and the like; hydroxyl-containing acrylates such as 2-hydroxyethyl acrylate, hydroxypropyl acrylate, polyethylene glycol monoacrylate, polypropylene glycol monoacrylate, ε-caprolactone adduct of 2-hydroxyethyl acrylate, β-methyl-γ-valerolactone adduct of 2-hydroxyethyl acrylate, glycerol monoacrylate, glycerol diacrylate and the like; hydroxyl-containing methacrylates such as 2-hydroxyethyl methacrylate, hydroxypropyl methacrylate, polyethylene glycol monomethacrylate, polypropylene glycol monomethacrylate, ε-caprolactone adduct of 2-hydroxyethyl methacrylate, β-methyl-γ-valerolactone adduct of 2-hydroxyethyl methacrylate, glycerol monomethacrylate, glycerol dimethacrylate and the like; allyl compounds such as allyl alcohol, glycerol monoallyl ether, glycerol diallyl ether and the like; etc. Among these compounds, preferable are ethylenically unsaturated monomers having an active hydrogen-containing group such as 2-hydroxyethyl acrylate, ε-caprolactone adduct of 2-hydroxyethyl acrylate, 2-hydroxyethyl methacrylate, ε-caprolactone adduct of 2-hydroxyethyl methacrylate and the like.

The radical polymerization initiator used in the radical polymerization of the ethylenically unsaturated monomer includes, for example, azo compounds such as 2,2'-azobisisobutyronitrile, 2,2'-azobis-2-methylbutyronitrile, dimethyl 2,2'-azobisisobutyrate, azobiscyanovaleric acid, 1,1'-azobis(cyclohexane-1-carbonitrile), 2,2'-azobis(2,4-dimethylvaleronitrile), 2,2'-azobis(4-methoxy-2,4-dimethylvaleronitrile) and the like; organic peroxides such as 1,1-bis(t-butylperoxy)-3,3,5-trimethylcyclohexane, 1,1-bis(t-hexylperoxy)cyclohexane, 1,1-bis(t-hexylperoxy)-3,3,5-trimethylcyclohexane, 1,1-bis(t-butylperoxy)cyclohexane, 1,1-bis(t-butylperoxy)cyclododecane, n-butyl 4,4-bis(t-butylperoxy)valerate, 2,2-bis(t-butylperoxy)butane, t-butyl hydroperoxide, diisopropylbenzene hydroperoxide, p-menthane hydroperoxide, t-hexyl peroxide, 1,1,3,3-tetramethylbutyl peroxide, t-butyl cumyl peroxide, dicumyl peroxide, di-t-butyl peroxide, isobutyryl peroxide, 3,5,5-trimethylhexanoyl peroxide, octanoyl peroxide, lauroyl peroxide, stearoyl peroxide, succinic acid peroxide, benzoyl peroxide, toluyl benzoyl peroxide, diisopropyl peroxydicarbonate, di-n-propyl peroxydicarbonate, bis(4-t-butylcyclohexyl)peroxydicarbonate, di-2-ethoxyethyl peroxydicarbonate, di-2-methoxybutyl peroxydicarbonate, di-2-ethylhexyl peroxydicarbonate, di-(3-methyl-3-methoxybutyl)peroxydicarbonate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 2,5-dimethyl-2,5-bis(2-ethylhexylperoxy)hexane, 1,1,3,3-tetramethylbutylperoxy-2-ethylhexanoate, 1-cyclohexyl-1-methylethyl peroxy-2-ethylhexanoate, t-hexyl peroxy-2-ethylhexanoate, t-butyl peroxy-2-ethylhexanoate, t-butyl peroxyisobutyrate, t-butyl peroxylaurate, t-butyl peroxy-3,5,5-trimethylhexanoate, t-hexyl peroxyisopropylmonocarbonate, t-butyl peroxyisopropylmonocarbonate, t-butyl peroxy-2-ethylhexylmonocarbonate, 2,5-dimethyl-2,5-bis(benzoylperoxy)hexane, 2,5-dimethyl-2,5-bis(m-toluoylperoxy)hexane, t-butyl peroxyacetate, t-hexyl peroxybenzoate, t-butyl peroxy-m-toluoylbenzoate, t-butyl peroxybenzoate, bis(t-butylperoxy)isophthalate and the like.

The urethane prepolymer having a mercapto group and a hydrophilic, polar group used in this invention is, for example, a reaction product of an organic polyisocyanate with a compound having a mercapto group and an active hydrogen-containing group, a compound having a hydrophilic, polar group and an active hydrogen-containing group and, if desired, a compound having an active hydrogen-containing group. The above active hydrogen-containing group includes groups whose reactivities with the isocyanate group are equal to or higher than that of mercapto group, namely, hydroxyl group, amino group, imino group, mercapto group and the like.

The above organic polyisocyanate includes aromatic diisocyanates such as 4,4'-diphenylmethane diisocyanate, 2,4'-diphenylmethane diisocyanate, 2,2'-diphenylmethane diisocyanate, 2,4-toluene diisocyanate, 2,6-toluene diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, 1,2-phenylene diisocyanate, 1,3-phenylene diisocyanate, 1,4-phenylene diisocyanate, 1,4-naphthalene diisocyanate, 1,5-naphthalene diisocyanate, 3,3'-dimethoxydiphenyl-4,4'-diisocyanate and the like; aliphatic diisocyanates such as 1,6-hexamethylene diisocyanate, 1,4-tetramethylene diisocyanate, lysine diisocyanate and the like; araliphatic diisocyanates such as o-xylene diisocyanate, m-xylene diisocyanate, p-xylene diisocyanate, tetramethylxylene diisocyanate and the like; alicyclic diisocyanates such as isophorone diisocyanate, hydrogenated toluene diisocyanate, hydrogenated xylene diisocyanate, hydrogenated diphenylmethane diisocyanate, hydrogenated tetramethylxylene diisocyanate and the like; etc. Moreover, there can also be used so-called modified polyisocyanates such as adducts of these organic diisocyanates, biuret bond-containing polyisocyanates derived from these organic diisocyanates, isocyanurate bond-containing polyisocyanates derived from these organic diisocyanates, uretonimine bond-containing polyisocyanates derived from these organic diisocyanates, uretdione bond-containing polyisocyanates derived from these organic diisocyanates, carbodiimide group-containing polyisocyanates derived from these organic diisocyanates and the like. In addition, polyisocyanates, which are the so-called polymeric polyisocyanates, such as polyphenylenepolymethylene polyisocyanate, crude toluene diisocyanate and the like can also be used. These organic polyisocyanates can be used alone or in admixture of two or more. Among these organic polyisocyanates, aliphatic and alicyclic polyisocyanates are preferable when weather resistance and the like are taken into consideration, and in particular, hexamethylene diisocyanate, isophorone diisocyanate, hydrogenated xylene diisocyanate and hydrogenated diphenylmethane diisocyanate are most preferable.

The compound having a mercapto group and an active hydrogen-containing group to be reacted with the organic polyisocyanate are preferably hydroxythiol and aminothiol.

The hydroxythiol includes monomercaptomonool compounds such as 2-mercapto-1-hydroxyethane, 2-mercapto-1-hydroxypropane, 1-mercapto-2-hydroxypropane, 3-mercapto-1-hydroxypropane, 2-mercapto-1-hydroxybutane, 3-mercapto-1-hydroxybutane, 4-mercapto-1-hydroxybutane and the like; monomercaptodiol compounds such as thioglycerol, 2,3-dihydroxy-1-mercaptobutane, 2,3-dihydroxy-1-mercaptopentane, 3,4-dihydroxy-1-mercaptobutane, 3,4-dihydroxy-1-mercaptopentane, 3,4-dihydroxy-1-mercaptohexane and the like; dimercaptomonool compounds such as 2-hydroxy-1,3-dimercaptopropane, 1-hydroxy-2,3-dimercaptopropane, 2-hydroxy-1,3-dimercaptobutane, 1-hydroxy-2,3-dimercaptobutane, 2-hydroxy-1,3-dimercaptopentane, 2-hydroxy-1,3-dimercaptohexane, 3-hydroxy-1,4-dimercaptobutane, 3-hydroxy-1,4-dimercaptopentane, 3-hydroxy-1,4-dimercaptohexane and the like; etc.

The aminothiol includes β-mercaptoethylamine, β-mercaptopropylamine, γ-mercaptopropylamine, 2-aminothiophenol, 3-aminothiophenol, 4-aminothiophenol and the like.

These compounds having a mercapto group and an active hydrogen-containing group may be used alone or in admixture of two or more. Incidentally, the compounds having a mercapto group and an active hydrogen-containing group used in this invention are preferably 2-mercapto-1-hydroxyethane, thioglycerol and β-mercaptoethylamine.

The compound having an active hydrogen-containing group (other than mercapto group) to be reacted with the organic polyisocyanate includes those called long chain polyols and those called chain extenders in the polyurethane industry. In this invention, preferable is one containing 50 to 90% by weight of a long chain polyol in the urethane prepolymer having a mercapto group and a hydrophilic, polar group.

This long chain polyol includes polyester polyol, polycarbonate polyol, polyether polyol, polyolefine polyol, animal and vegetable type polyols and copolyols thereof and the like. These long chain polyols may be used alone or in admixture of two or more.

The polyester polyol includes polyester polyols and polyesteramide polyols obtained by dehydration-condensation reaction of at least one member selected from the group consisting of polycarboxylic acids such as succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalenedicarboxylic acid, trimellitic acid and the like, esters of the polycarboxylic acids and anhydrides of the polycarboxylic acids with at least one member selected from the group consisting of low molecular weight polyols such as ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, dipropylene glycol, 1,4-cyclohexanedimethanol, ethylene oxide adduct of bisphenol A, propylene oxide adduct of bisphenol A, trimethylolpropane, glycerin, pentaerythritol and the like; low molecular weight polyamines such as hexamethylenediamine, xylylenediamine, isophoronediamine and the like; and low molecular weight aminoalcohols such as monoethanolamine, diethanolamine and the like.

Moreover, lactone type polyester polyols are mentioned which are obtained by ring-opening polymerization of cyclic ester (lactone) monomers such as ε-caprolactone, γ-valerolactone and the like using the low molecular weight polyol, low molecular weight polyamine or low molecular weight aminoalcohol as the initiator.

The polycarbonate polyol includes those obtained by dealcoholation reaction, dephenolation reaction or the like of the low molecular weight polyols used in the synthesis of the above-mentioned polyester polyols with diethylene carbonate, dimethyl carbonate, diethyl carbonate, diphenyl carbonate or the like.

The polyether polyol includes polyethylene glycol, polypropylene glycol, polytetramethylene ether glycol and the like obtained by ring-opening polymerization of ethylene oxide, propylene oxide, tetrahydrofuran or the like using as the initiator the low molecular weight polyol, low molecular weight polyamine or low molecular weight aminoalcohol used in the above-mentioned polyester polyol; polyether polyols obtained by copolymerizing them; and polyester ether polyols obtained using the above-mentioned polyester polyol or polycarbonate polyol as the initiator.

The polyolefine polyol includes hydroxyl group-containing polybutadienes, hydrogenated hydroxyl group-containing polybutadienes, hydroxyl group-containing polyisoprenes, hydrogenated hydroxyl group-containing polyisoprenes, hydroxyl group-containing chlorinated polypropylenes, hydroxyl group-containing chlorinated polyethylenes and the like.

The animal and vegetable polyols include castor oil type polyols, silk fibroin and the like.

Furthermore, in addition to dimer acid type polyols and hydrogenated dimer acid type polyols, there can be adequately used resins such as epoxy resins, polyamide resins, polyester resins, acrylic resins, rosin resins, urea resins, melamine resins, phenolic resins, cumarone resins, polyvinyl alcohol and the like as the long chain polyol as far as they have at least two active hydrogen-containing groups.

The number average molecular weights of these long chain polyols are preferably 500 to 10,000, particularly preferably 1,000 to 5,000. When adhesiveness, durability and the like are taken into consideration, one containing 50 to 100% by weight of any of polyester polyol, polycarbonate polyol and dimer acid type polyol in the long chain polyol are more preferable.

The chain extender is a compound having a number average molecular weight of less than 500 and having at least two active hydrogen-containing groups in the molecule, and includes specifically the above-mentioned low molecular weight polyols, low molecular weight polyamines and low molecular weight aminoalcohols and the like.

In this invention, in the production of a self-emulsifiable copolymer, the use of a compound which has an active hydrogen-containing group and an ethylenically unsaturated double bond and which reacts with the organic polyisocyanate is preferred because the control of the molecular weight is facilitated. In this case, it follows that a structure in which the acrylic oligomer and the polyurethane are grafted is formed, and that the acrylic segment and the urethane segment contain a self-emulsifiable copolymer in which the acrylic segment and the urethane segment are bonded through the group produced by the radical polymerization of the ethylenically unsaturated double bond.

The compound having an active hydrogen-containing group and an ethylenically unsaturated double bond includes ethylenically unsaturated monomers which have an active hydrogen-containing group in the above-mentioned other ethylenically unsaturated monomers. Among them, preferable are 2-hydroxyethyl acrylate, ε-caprolactone adduct of 2-hydroxyethyl acrylate, 2-hydroxyethyl methacrylate and ε-caprolactone adduct of 2-hydroxyethyl methacrylate.

The hydrophilic, polar group of the compound having a hydrophilic, polar group and an active hydrogen-containing group to be reacted with the organic polyisocyanate is hydrophilic, nonionic group; hydrophilic, anionic group; hydrophilic, cationic group; or hydrophilic, amphoteric group.

The hydrophilic, nonionic group is the recurring unit portion of the oxyethylene group introduced into the main chain and/or side chain of the resin.

The hydrophilic, anionic group is composed of an acid such as carboxylic acid, sulfonic acid, phosphoric acid, phosphonic acid, phosphinic acid, thiosulfonic acid or the like and the basic neutralizing agent mentioned hereinafter. Incidentally, the acid component is bonded directly to the self-emulsifiable copolymer, but the neutralizing agent is not bonded directly to the copolymer.

The hydrophilic, cationic group is composed of a base such as tertiary amino group or the like and the acidic neutralizing agent mentioned hereinafter. Incidentally, the base component is bonded directly to the self-emulsifiable copolymer, but the neutralizing agent is not bonded directly to the copolymer.

As the compound having a hydrophilic, nonionic group and an active hydrogen-containing group, there are specifically mentioned poly(oxyalkylene) ether polyols having at least one active hydrogen-containing group, poly(oxyalkylene) fatty acid ester polyols having at least one active hydrogen-containing group, and the like.

The poly(oxyalkylene) ether polyol having at least one active hydrogen-containing group is obtained by addition-polymerizing an alkylene oxide using a compound having at least one active hydrogen-containing group as an initiator. This initiator includes methanol, ethanol, propanol, n-butanol, cyclohexanol, phenol, ethylene glycol, propylene glycol, aniline, trimethylolpropane, glycerin, pentaerythritol and the like. Among them, those which have a low molecular weight and are difunctional such as ethylene glycol are preferable. As the alkylene oxide, there are mentioned ethylene oxide, propylene oxide and the like. Incidentally, the alkylene oxide may partly contain a compound having an epoxy group such as styrene oxide, epichlorohydrin, butyl glycidyl ether or the like.

Furthermore, as the fatty acid to be used in the production of the poly(oxyalkylene) fatty acid ester polyols having at least one active hydrogen-containing group, there are mentioned acetic acid, propionic acid, butyric acid and the like.

Incidentally, the polyether chain present in the above-mentioned starting material is preferably one which has 3 to 300 oxyalkylene groups, particularly 5 to 200 oxyalkylene groups, and which contains at least 50 mol %, particularly at least 60 mol %, of oxyethylene group.

The compound having a hydrophilic, anionic group-forming group and an active hydrogen-containing group includes α-hydroxypropionic acid, hydroxysuccinic acid, dihydroxysuccinic acid, ε-hydroxypropane-1,2,3-tricarboxylic acid, hydroxyacetic acid, α-hydroxybutyric acid, hydroxystearic acid, ricinoleic acid, ricinoelaidic acid, ricinostearolic acid, salicylic acid, mandelic acid and the like; hydroxyfatty acids which are hydroxylation products of unsaturated fatty acids such as oleic acid, ricinoleic acid, linoleic acid and the like; diamine type amino acids such as glutamine, asparagine, lysine, diaminopropionic acid, ornithine, diaminobenzoic acid, diaminobenzenesulfonic acid and the like; monoamine type amino acids such as glycine, alanine, glutamic acid, taurine, aminocaproic acid, aminobenzoic acid, aminoisophthalic acid, sulfamic acid and the like; carboxyl group-containing polyols such as 2,2-dimethylolpropionic acid, 2,2-dimethylolbutyric acid, 2,2-dimethylolvaleric acid and the like; chelate type compounds such as 1:1 (mol ratio) adduct of iminodiacetic acid to glycidol; polyester polyols having introduced thereinto a 5-sulfoisophthalic acid skeleton; polycaprolactone in which water or a carboxyl group-containing alcohol is used as an initiator; ester-exchange products of a polyester having an active hydrogen-containing group with a carboxyl group-containing alcohol; ester-exchange products of a polycarbonate having an active hydrogen-containing group with a carboxyl group-containing alcohol; and the like.

Half ester mixtures and half amide mixtures, each of which has a carboxyl group and which is obtained by reacting a polycarboxylic anhydride with the above-mentioned long chain polyol, a low molecular weight polyol such as low molecular weight glycol, trimethylolpropane, glycerin or the like or a polyamine can also be used. In particular, when a polyol is added to a dianhydride such as pyromellitic anhydride or the like, two carboxyl groups are produced, so that it follows that a hydrophilic, anionic group can be introduced into the molecular chain of the polyester polyol.

The basic neutralizing agent for forming the hydrophilic, anionic group includes organic amines such as ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine, 2-amino-2-ethyl-1-propanol, pyridine and the like; alkali metals such as lithium, potassium, sodium and the like; inorganic alkalis such as sodium hydroxide, potassium hydroxide and the like; ammonia; etc. Incidentally, preferable neutralizing agents among them are organic amines and ammonia, and particularly preferable are ethylamine, trimethylamine, triethylamine and ammonia.

Incidentally, each of the compounds having a hydrophilic, anionic group-forming group and an active hydrogen-containing group and the basic neutralizing agents may be used alone or in admixture of two or more.

The compound having a hydrophilic, cationic group-forming group and an active hydrogen-containing group includes N,N-dimethylethanolamine, N,N-diethylethanolamine, N,N-dipropylethanolamine, N,N-diphenylethanolamine, N-methyl-N-ethylethanolamine, N-methyl-N-phenylethanolamine, N,N-dimethylpropanolamine, N-methyl-N-ethylpropanolamine, N-methyldiethanolamine, N-ethyldiethanolamine, N-methyldipropanolamine, N-phenyldiethanolamine, N-phenyldipropanolamine, N-hydroxyethyl-N-hydroxypropylmethylamine, N,N'-dihydroxyethylpiperazine, triethanolamine, trisisopropanolamine, N-methyl-bis(3-aminopropyl)amine, N-methyl-bis(2-aminopropyl)amine and the like. In addition, adducts of an alkylene oxide to ammonia, a primary amine such as methylamine or a secondary amine such as dimethylamine can be used.

The acidic neutralizing agent for forming the hydrophilic, cationic group includes inorganic and organic acids, for example, hydrochloric acid, acetic acid, propionic acid, lactic acid, cyanoacetic acid, phosphoric acid, sulfuric acid and the like. The quaternizing agent includes dimethyl sulfate, benzyl chloride, bromoacetamide, chloroacetamide and alkyl halides such as ethyl bromide, propyl bromide, butyl bromide and the like.

Also, the other compounds having a hydrophilic, cationic group and an active hydrogen-containing group include cationic compounds, for example, primary amine salts, secondary amine salts, tertiary amine salts, pyridinium salts and the like.

Incidentally, each of the compounds having a hydrophilic, cationic group-forming group and an active hydrogen-containing group and the acidic neutralizing agents may be used alone or in admixture of two or more.

As examples of the compound having a hydrophilic, amphoteric group and an active hydrogen-containing group, there can be mentioned those compounds having an amphoteric group such as a sulfobetaine group which are produced by the reaction of a tertiary amino group-containing polyol with sultone.

The amount of the hydrophilic, polar group introduced into the self-emulsifiable copolymer of this invention is as follows:

In the case of introducing the hydrophilic, anionic group, the content of the hydrophilic, anionic group (suitably ethylene oxide unit) is preferably 0.1 to 40% by weight, particularly preferably 0.5 to 30% by weight, based on the total weight of the self-emulsifiable copolymer.

In the case of introducing the hydrophilic, anionic group, the hydrophilic, cationic group or the hydrophilic, amphoteric group, the amount of said group introduced is preferably 0.05 to 0.8 mmol, particularly preferably 0.1 to 0.7 mmol, per gram of the self-emulsifiable copolymer.

In this invention, the hydrophilic, polar group is preferably the hydrophilic, anionic group, more preferably a hydrophilic, anionic group composed of a weak acid of $3 \leq pKa < 7$ and a weak base of $7 < pKa \leq 12$, ($pKa = -\log_{10} Ka$ and Ka is an acidity constant in a dilute aqueous solution at 25° C.). Particularly preferable is a hydrophilic, anionic group which is carboxylic acid-ammonia or carboxylic acid-organic tertiary amine. The reason therefor is that the hydrophilic, anionic group is composed of an acid bonded directly to the resin and a free base neutralizing agent. In the case of a hydrophilic, anionic group of weak acid-weak base, the affinity between the acid and the base is weak, and the molecular weight of the neutralizing agent is low, so that the neutralizing agent tends to be blown away during the formation of a coating film. As a result, the hydrophilicity of the resin from which the neutralizing agent has been blown away becomes lower than before the neutralizing agent is blown away. As a result, it is considered that water resistance become imparted to the coating film.

From the above, in this invention, it is preferable to use a carboxyl group-containing polyol, and more specifically, the use of dimethylolpropionic acid and/or dimethylolbutyric acid is preferable.

The number average molecular weight of the self-emulsifiable copolymer in the aqueous emulsion of this invention is preferably 5,000 to 100,000 more preferably 10,000 to 80,000. When the number average molecular weight is less than 5,000, the film strength becomes insufficient. When it exceeds 100,000, the workability in the production of the aqueous emulsion becomes inferior. Incidentally, the number average molecular weight in this invention is a polystyrene-reduced value determined by measurement using a refractive index detector by a gel permeation chromatography.

Moreover, the average particle size of the copolymer in the aqueous emulsion of this invention is preferably 1 to 1,000 nm, particularly preferably 3 to 900 nm. Incidentally, the average particle size in this invention is a value obtained by analyzing by a cumulant method a value obtained by measurement according to a dynamic light scattering method.

It is preferable that a keto group or aldehyde group is present in the self-emulsifiable copolymer in the aqueous emulsion of this invention. This is because by adding a polyfunctional hydrazide compound to the aqueous emulsion of the self-emulsifiable copolymer, it becomes possible to impart a one-component curability at room temperature to the aqueous emulsion.

For introducing a keto group into the acrylic segment, the above-mentioned ethylenically unsaturated monomer having a keto group is used.

For introducing a keto group into the urethane segment, there are used hydroxymethyl ethyl ketone, hydroxyethyl methyl ketone, bis(hydroxymethyl) ketone, hydroxymethyl 2-hydroxyethyl ketone, bis(2-hydroxyethyl) ketone, aminomethyl ethyl ketone, bis(aminomethyl) ketone, aminomethyl 2-aminoethyl ketone, bis(2-aminoethyl) ketone and the like.

In this invention, it is preferable to introduce a keto or aldehyde group into at least the acrylic segment. When the easy availability of the starting materials and the like are taken into consideration, it is more preferable to introduce the keto or aldehyde group into only the acrylic segment. Moreover, when the storage stability of the resin obtained, the toxicity of the starting materials and the like are taken into consideration, those compounds into which a keto group has been introduced are preferred.

Other aqueous emulsions of this invention are aqueous emulsions composed of a self-emulsifiable copolymer having a keto group or an aldehyde group and a polyfunctional hydrazide compound. These aqueous emulsions have one-component curability at room temperature as mentioned above, so that when they are applied to paint, adhesive, coating agent, printing ink and the like, there is no factor which causes a principal reagent-curing agent-metering miss as in the two pack type. Moreover, a larger amount of energy than for blowing away water is not required, so that the productivity is excellent.

The polyfunctional hydrazide compound in this invention refers to a compound having at least two hydrazide groups in one molecule, and includes specifically dihydrazide compounds such as 4,4'-bisbenzenedihydrazide, 2,6-pyridinedihydrazide, 1,4-cyclohexanedihydrazide, N,N'-hexamethylene bissemicarbazide and the like; dicarboxylic acid dihydrazides such as oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanedicarboxylic acid dihydrazide, hexadecanedicarboxylic acid dihydrazide, maleic acid dihydrazide, fumaric acid dihydrazide, itaconic acid dihydrazide, terephthalic acid dihydrazide, isophthalic acid dihydrazide, phthalic acid dihydrazide, 2,6-naphthoic acid dihydrazide, 1,4-naphthoic acid dihydrazide, tartaric acid dihydrazide, malic acid dihydrazide, iminodiacetic acid dihydrazide and the like; tricarboxylic acid trihydrazides such as citric acid trihydrazide, 1,2,4-benzenetricarboxylic acid trihydrazide, nitrilotriacetic acid trihydrazide, cyclohexanetricarboxylic acid trihydrazide, trimellitic acid trihydrazide and the like; tetracarboxylic acid tetrahydrazides such as ethylenediaminetetraacetic acid tetrahydrazide, 1,4,5,8-naphthoic acid tetrahydrazide, pyromellitic acid tetrahydrazide and the like; carbonic acid dihydrazides represented by the formula 5; carbohydrazide, thiocarbodihydrazide, bissemicarbazides represented by the formula 6; acid hydrazide type polymers having a group represented by the formula 7:

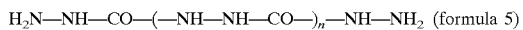
$H_2N-NH-CO-(-NH-NH-CO-)_n-NH-NH_2$ (formula 5)

wherein n is an integer of 1 to 5.

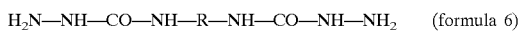
$H_2N-NH-CO-NH-R-NH-CO-NH-NH_2$ (formula 6)

wherein R represents a bivalent hydrocarbon group.

(formula 7)

wherein X represents a hydrogen atom or a carboxyl group and Y represents a hydrogen atom or a methyl group.

Among these polyfunctional hydrazide compounds, preferable are those having a water-solubility at 25° C. of at least 3%, and particularly preferable are carbohydrazide, malonic acid dihydrazide, succinic acid dihydrazide, glutaric acid dihydrazide, adipic acid dihydrazide, tartaric acid dihydrazide, malic acid dihydrazide and citric acid trihydrazide.

The amount of the polyfunctional hydrazide compound added is preferably 0.1 to 2 equivalents, particularly preferably 0.3 to 1.5 equivalents, per equivalent of the keto group or aldehyde group of the self-emulsifiable copolymer. When the amount of the polyfunctional hydrazide compound added is less than 0.1 equivalent, the cross-linking density becomes too small, so that the film strength becomes insufficient. Moreover, when it exceeds 2 equivalents, the amount of free hydrazide compound is too large, so that the film appearance tends to be adversely affected.

The aqueous emulsion of the self-emulsifiable copolymer of this invention can, if necessary, have added thereto additives and adjuvants which are conventionally used in aqueous systems. There can be added, for example, pigment, dye, antiseptic, mildewproofing agent, microbicide, thixotropic agent, antiblocking agent, dispersion stabilizer, viscosity regulator, film-forming adjuvant, leveling agent, antigelling agent, light stabilizer, antioxidant, ultraviolet absorber, inorganic or organic filler, plasticizer, lubricant, defoaming agent, surface active agent, antistatic agent, reinforcing agent, catalyst and the like. Moreover, to the aqueous emulsion may be added water for regulating the solid content and viscosity and an organic solvent such as isopropanol or N-methylpyrrolidone for regulating the surface tension before use.

The aqueous emulsion of the self-emulsifiable copolymer of this invention can be used in blend with an emulsion, suspension or aqueous solution of other resins. Said other resins include polyurethane, acrylic resin, polyester, polyolefine, polyamide, rubber and the like.

A description is made below of the process for producing the aqueous emulsion of a self-emulsifiable copolymer of this invention.

The process of this invention for producing an aqueous emulsion of a self-emulsifiable copolymer consists of a combination of the following three steps:

The First Step (urethanization step):

A step of reacting an isocyanate group with an active hydrogen-containing group.

The Second Step (radical copolymerization step):

A step of radically polymerizing an ethylenically unsaturated double bond using a mercapto group as a chain transfer agent.

The Third Step (emulsifying step):

A step of emulsifying in water the copolymer obtained.

The first step is a step of obtaining a urethane prepolymer having a mercapto group and a hydrophilic, polar group. The first step comprises, for example, (A) successively subjecting the above-mentioned organic polyisocyanate, the compound having a mercapto group and an active hydrogen-containing group and the compound having a hydrophilic, polar group and an active hydrogen-containing group to reaction or (B) simultaneously subjecting the above three or four compounds to reaction. At this time, the final equivalent ratio between the total of isocyanate groups and the total of active hydrogen-containing groups is such a ratio as to satisfy the conditions under which no gelation is caused during the reaction and which are determined by suitably selecting such factors as the target average molecular weight, the average NCO functionality of the organic polyisocyanate, the average number of functional groups of the compound having an active hydrogen-containing group and the like. The blending ratio is according to the gelation theory which has been theoretically calculated by J. P. Flory, Khun, et al.; however, in fact, it can be produced without gelling by reacting them at a blending ratio in which the reactivity ratio of the reactive groups contained in the above components has been taken into consideration.

(A) In the case of the successive reaction, for example, the organic polyisocyanate, the compound having a hydrophilic, polar group and an active hydrogen-containing group other than the mercapto group and, if desired, the compound having an active hydrogen-containing group are subjected to reaction under the conditions of an excess of isocyanate group to synthesize a prepolymer having terminal isocyanate groups. Subsequently, the said prepolymer and the compound having a mercapto group and an active hydrogen-containing group are subjected to reaction under the conditions of an excess of the active hydrogen-containing group including the mercapto group, to obtain the polyurethane prepolymer having a mercapto group and a hydrophilic, polar group.

(B) In the case of simultaneous reaction, for example, the organic polyisocyanate, the compound having a hydrophilic, polar group and an active hydrogen-containing group other than mercapto group, the compound having a mercapto group and an active hydrogen-containing group and, if desired, the compound having an active hydrogen-containing group are subjected to reaction under the conditions of an excess of the active hydrogen-containing group including the mercapto group to obtain the polyurethane prepolymer having a mercapto group and a hydrophilic, polar group.

In either case, the isocyanate group reacts preferentially with a hydroxyl group, an amino group, an imino group and the like which have a larger reactivity than the mercapto group, and finally, it follows that the isocyanate group-free urethane prepolymer having a mercapto group and a hydrophilic, polar group is obtained. Incidentally, the simultaneous reaction method (B) is preferred because the number of production steps becomes small.

The urethanization reaction can be effected in the molten state, in the bulk state or, if necessary, in a solvent which is usually used in the polyurethane industry. The solvent includes, for example, aromatic hydrocarbon solvents such as toluene, xylene, ethylbenzene and the like; ester solvents such as methyl acetate, ethyl acetate and the like; ketone solvents such as acetone, methyl ethyl ketone, methyl isobutyl ketone, cyclohexanone and the like; glycol ether ester solvents such as ethylene glycol monomethyl ether acetate, propylene glycol monoethyl ether acetate and the like; ether solvents such as tetrahydrofuran, dioxane and the like; alcohol solvents such as methanol, ethanol, isopropanol and the like; and polar solvents such as dimethylformamide, dimethylacetamide, N-methylpyrrolidone and the like, and these can be used alone or in admixture of two or more.

Moreover, in the urethanization reaction, if necessary, a urethanizing catalyst can be used. Specific examples thereof include organometallic compounds such as dibutyltin dilaurate, dioctyltin dilaurate and the like; organic amines such as triethylenediamine, triethylamine and the like; salts thereof; and the like.

The reaction temperature at this time is preferably 30 to 120° C., more preferably 50 to 100° C.

The reaction apparatus is not critical as far as the above-mentioned reactions can be uniformly conducted, and there can be used a reactor equipped with a stirring means and a mixing-kneading apparatus such as a kneader, a single screw or multiscrew extruding reactor and the like. Considering the second and third steps, the reaction apparatus is preferably a reactor equipped with a stirring means.

The starting materials in the second step are, for example,
(1) the urethane prepolymer having a mercapto group and a hydrophilic, polar group obtained in the first step, an ethylenically unsaturated monomer and a radical polymerization initiator, or
(2) the organic polyisocyanate, the compound having a hydrophilic, polar group and an active hydrogen-containing group (other than the mercapto group), the compound having a mercapto group and an active hydrogen-containing group and, if desired, (the other) compound having an active hydrogen-containing group, an ethylenically unsaturated monomer and a radical polymerization initiator. That is to say, the method (1) is a method in which the second step is allowed to proceed after the first step, and the method (2) is a method in which the first step and the second step are allowed to proceed simultaneously. In the second step, the use of the above-mentioned organic solvent is preferred from the viewpoint of removal of heat of reaction and easiness of stirring. In this invention, the method (1) is preferred.

The specific method of feeding each of the starting materials in the second step is not critical, and all the starting materials may be fed at one time or may be fed in portions. Moreover, the starting materials may be fed batchwise or continuously. Preferable is a method of feeding at least the radical polymerization initiator by dropping or the like later on to the reaction system.

Incidentally, in the method (1), a polyurethane prepolymer having a mercapto group and a hydrophilic, polar group is obtained. The number average molecular weight of this urethane prepolymer is preferably 1,000 to 50,000, particularly preferably 3,000 to 40,000. When the number average molecular weight is too small, the urethanization reaction is insufficient, so that the flexibility tends to become poor. Furthermore, when the number average molecular weight exceeds 50,000, the viscosity becomes too high, so that the second and third steps tend to become difficult.

The content of the mercapto group in the state before the radical copolymerization is preferably 0.01 to 1.0 mmol/g, particularly preferably 0.03 to 0.5 mmol/g, in terms of the solid content. The mercapto group content is less than 0.01 mmol/g, the objective self-emulsifiable copolymer is difficult to obtain. Moreover, when the mercapto group content exceeds 1.0 mmol/g, chain transfer is caused much more than necessary and the molecule of the copolymer becomes difficult to extend. Incidentally, when the compound having an active hydrogen-containing group and an ethylenically unsaturated double bond is used in the reaction system, the control of the molecular weight of the self-emulsifiable copolymer obtained become easy, so that the use of said compound is preferable. The amount of the compound introduced is preferably not more than 80 mol %, particularly preferably 5 to 75 mol %, and most preferably 10 to 70 mol %, based on the molar amount of the mercapto group.

The amount of the polymerization initiator fed in the radical polymerization is preferably 1 to 10 mol %, particularly preferably 0.5 to 8 mol %, based on the total molar amount of the double bonds present before the reaction. When the amount of the radical polymerization initiator fed is too small, it is difficult to allow the copolymerization to proceed well and the objective copolymer is difficult to obtain. Furthermore, the amount of the radical polymerization initiator fed is too large, the molecular weight of the copolymer obtained is too low and the strength and durability tend to become lacking.

The reaction temperature in the radical polymerization is preferably 30 to 120° C., particularly preferably 50 to 100° C. Further, the ratio between the total weight of the ethylenically unsaturated monomers and the total weight of the raw materials fed for the production of urethane segment is preferably 5/95 to 95/5, particularly preferably 10/90 to 90/10.

After the first and second steps have been completed, the reaction is allowed to proceed to the third step. The emulsifying method is not critical, and the emulsification is carried out in a heretofore known manner. Incidentally, when an acid and a tertiary amine are present in the system, the above-mentioned neutralizing agent and quaternizing agent are preferably fed before or simultaneously with the feeding of water. Moreover, after the emulsification in water, if an organic solvent is present in the system, it is better to carry out the desolvation. The residual solvent content in the aqueous emulsion of this invention is preferably less than 5%. Incidentally, the organic solvent removed can be recovered and then used in the above-mentioned second step.

A paint in which a keto group or an aldehyde group is present in the self-emulsifiable copolymer and a polyfunctional hydrazide compound is incorporated into the aqueous emulsion is cured at ordinary temperature upon blowing away of water after the coating, to form a coating film fit for practical use.

In other cases than the above, a coating film fit for practical use is formed by adding the aqueous (block) polyisocyanate curing agent just before the coating to allow the coating film to have a cross-linking structure. In this case, heating is preferred to promote reaction between the (resulting) isocyanate group and the active hydrogen-containing group. As specific curing agents, there are mentioned Aquanate 100 and Aquanate 200 (trade names of NIPPON POLYURETHANE INDUSTRY CO., LTD.) and the like. When an aqueous (block) polyisocyanate curing agent is used, the amount of the aqueous (block) polyisocyanate blended is such that the (resulting) isocyanate group/active hydrogen-containing group ratio becomes 10/1 to 1/10 (by mol).

The aqueous emulsion of a self-emulsifiable copolymer of this invention does not cause phase separation because the acrylic component and the urethane component are copolymerized, and hence, it is not clouded and exhibits a better storage stability than the conventional aqueous acryl-urethane emulsion. Moreover, the aqueous paint of this invention can be applied to all substrates to be coated such as wood, metal, plastic, concrete, mortar and the like and exerts excellent coating film performance such as flexibility, durability and the like. Furthermore, the aqueous printing ink of this invention can be printed on all substrates and is good in adhesiveness, pigment dispersibility, redissolvability and the like.

DESCRIPTION OF PREFERRED EMBODIMENTS

This invention is specifically explained below using Examples. However, this invention should not be construed to be limited thereto. Unless otherwise specified, part and % are by weight in the Examples and Comparative Examples.

Synthesis of Aqueous Emulsion of Self-emulsifiable Copolymer

EXAMPLE 1

In a reaction vessel equipped with a stirrer, a thermometer, a nitrogen-sealing tube and a condenser were placed 400 parts of a polycaprolactonediol having a number average molecular weight of 2,000 prepared using ethylene glycol as an initiator (referred to hereinafter as Polyol A), 14.9 parts of dimethylolbutanoic acid (referred to hereinafter as DMBA), 9.1 parts of 2-hydroxyethyl methacrylate (referred to hereinafter as HEMA), 10.1 parts of 2-mercapto-1-hydroxyethane (referred to hereinafter as MHE) and 56 parts of methyl ethyl ketone (referred to hereinafter as MEK) and dissolved at 50° C. Subsequently, 67.3 parts of hexamethylene diisocyanate (referred to hereinafter as HDI) and 0.05 part of dibutyltin dilaurate (referred to hereinafter as DBTDL) were placed therein, and thereafter, they were subjected to reaction at 75° C. until the isocyanate group disappeared when analyzed by an infrared absorbance analysis. Thereafter, 195 part of MEK and 251 parts of isopropanol (referred to hereinafter as IPA) were added to obtain a solution of a urethane prepolymer having a mercapto group and a hydrophilic, polar group (the solution is referred to hereinafter as PA-1), said solution having a solid content of 50.0%. The number average molecular weight of this PA-1 was 5,000, no keto group was contained and the mercapto group content was 0.26 mmol/g in terms of solid content and the carboxyl group content was 0.20 mmol/g in terms of solid content.

In the dropping tank of a reaction vessel (tank) equipped with a stirrer, a thermometer, a nitrogen-sealing tube, a condenser and a dropping tank were placed 30.0 parts of PA-1, 22.0 parts of methyl methacrylate (referred to hereinafter as MMA), 10.0 parts of n-butyl acrylate (referred to hereinafter as BA), 0.5 part of acrylic acid (referred to hereinafter as AA), 2.5 parts of diacetoneacrylamide (referred to hereinafter as DAAA), 1.0 part of 2,2'-azobis-2-isobutyronitrile (referred to hereinafter as AIBN), 25 parts of MEK and 25 parts of IPA, and then well mixed. Separately, in the reaction tank were placed 30.0 parts of PA-1, 22.0 parts of MMA, 10.0 parts of BA, 0.5 part of AA, 2.5 parts of DAAA, 10 parts of MEK and 10 parts of IPA, and then uniformly mixed. Subsequently, the reaction tank was heated to 75° C. and the liquid mixture in the dropping tank was dropped into the reaction tank over 5 hours. Thereafter, the resulting mixture was further subjected to reaction at the same temperature for 4 hours. Thereafter, 2.0 parts of triethylamine (referred to hereinafter as TEA) was added to the reaction mixture to sufficiently neutralize the same, after which aqueous hydrazide consisting of 149 parts of distilled water and 2.6 parts of adipic acid dihydrazide (referred to hereinafter as ADH) was added and the reaction mixture was emulsified. Thereafter, the MEK and the IPA present in the system were removed at 60° C. at 100 Torr to obtain an aqueous emulsion of a self-emulsifiable acrylurethane copolymer having a solid content of 40.1% (the emulsion is referred to hereinafter as EA-1).

The viscosity of EA-1 was 200 mPa·s/25° C., the number average molecular weight of the acryl-urethane copolymer was 22,000, the average particle size was 200 nm, the keto content was 0.29 mmol/g in terms of solid content, and the carboxyl group content was 0.20 mmol/g in terms of solid content.

EXAMPLES 2 TO 10 AND COMPARATIVES EXAMPLES 1 TO 7

In the same manner as in Example 1, except that the materials shown in Tables 1, 2 and 3 were used in the amounts shown in Tables 1, 2 and 3, aqueous emulsions of self-emulsifiable acryl-urethane copolymers referred to as EA-2 to EA-10 in Tables 2 and 3 were prepared, and in the same manner as in Example 1, except that the materials shown in Tables 4 and 5 were used in the amounts shown in Tables 4 and 5, aqueous emulsions of self-emulsifiable acryl-urethane copolymers referred to as EB-2 to EB-7 in Table 5 were prepared. Incidentally, EB-1 was not obtained because gelation was caused during the radical polymerization.

The materials placed in the dropping tank and the reaction tank in Examples 2 to 10 and Comparative Examples 1 to 7 were as follows:

EXAMPLE 5

Dropping tank: Ethylenically unsaturated monomer, radical polymerization initiator and solvent Reaction tank: Urethane prepolymer and ethylenically unsaturated monomer

EXAMPLES 7, 9 AND 10

Dropping tank: Radical polymerization initiator and solvent

Reaction tank: Urethane prepolymer and ethylenically unsaturated monomer

EXAMPLES 2 TO 4 AND COMPARATIVE EXAMPLES 1 TO 4

Dropping tank: Urethane prepolymer, ethylenically unsaturated monomer, radical polymerization initiator and solvent Reaction tank: Urethane prepolymer, ethylenically unsaturated monomer and solvent

EXAMPLES 6 AND 8

Dropping tank: Ethylenically unsaturated monomer, radical polymerization initiator and solvent Reaction tank: Urethane prepolymer

COMPARATIVE EXAMPLE 5

Dropping tank: Radical polymerization initiator and solvent

Reaction tank: Ethylenically unsaturated monomer and solvent

COMPARATIVE EXAMPLES 6 AND 7

Dropping tank: None
Reaction tank: Urethane prepolymer

EXAMPLE 11

In a reaction vessel equipped with a stirrer, a thermometer, a nitrogen-sealing tube and a condenser were placed 400 parts of a polyesterdiol having a number average molecular weight of 2,000 obtained from adipic acid and a mixed glycol of 1,6-hexanediol/neopentyl glycol=8/2 (mol ratio) (the polyesterdiol is referred to hereinafter as Polyol E), 13.4 parts of dimethylolpropionic acid (referred to hereinafter as DMPA) and 212 parts of MEK, and dissolved at 50° C. Subsequently, 88.9 parts of isophorone diisocyanate (referred to hereinafter as IPDI) and 0.15 part of EBTDL were placed therein, and the resulting mixture was then subjected to reaction at 75° C. for 4 hours. Thereafter, 15.4 parts of β-mercaptoethylamine (referred to hereinafter as MEA), 42 parts of MEK and 254 parts of IPA were placed therein. Thereafter, 10.1 parts of TEA was placed therein to obtain a solution of a urethane prepolymer having a mercapto group and a hydrophilic, polar group (the solution is referred to hereinafter as PA-8), said solution having a solid content of 49.8%. The number average molecular weight of PA-8 was 5,000, the keto group was not contained, the mercapto group content was 0.39 mmol/g in terms of solid content and the carboxyl group content was 0.19 mmol/g in terms of solid content.

In the dropping tank of a reaction vessel (tank) equipped with a stirrer, a thermometer, a nitrogen-sealing tube, a condenser and a dropping tank were placed 8.0 parts of MMA, 15.0 parts of BA, 1.0 part of AA, 1.0 part of 2-ethylhexyl acrylate (referred to here-inafter as EHA), 10.0 parts of acrylonitrile (referred to hereinafter as AN), 5.0 parts of HEMA, 5.0 parts of DAAA, 1.0 part of AIBN, 25 parts of MEK and 25 parts of IPA and then uniformly mixed. Separately, in the reaction tank were placed 20.0 parts of PA-8, 8.0 parts of MMA, 15.0 parts of BA, 1.0 part of AA, 1.0 part of EHA, 10.0 parts of AN, 5.0 parts of HEMA, 5.0 parts of DAAA, 20 parts of MEK and 20 parts of IPA and then uniformly mixed. Subsequently, the reaction tank was heated to 75° C. and the liquid mixture in the dropping tank was dropped into the reaction tank over 5 hours. Thereafter, the resulting mixture was further subjected to reaction at the same temperature for 4 hours. Thereafter, 2.8 parts of TEA was added to the reaction mixture to sufficiently neutralize the same and then aqueous hydrazide consisting of 148 parts of distilled water and 4.7 parts of glutaric acid dihydrazide (referred to hereinafter as GDH) was added thereto to emulsify the reaction mixture. Thereafter, the MEK and the IPA present in the system were removed at 60° C. at 100 Torr to obtain an aqueous emulsion of a self-emulsifiable acryl-urethane copolymer having a solid content of 39.9% (the emulsion is referred to hereinafter as EA-11).

The viscosity of EA-11 was 50 mPa·s/25° C., the number average molecular weight of the acryl-urethane copolymer was 29,000, the average particle size was 130 nm, the keto group content was 0.59 mmol/g in terms of solid content and the carboxyl group content was 0.30 mmol/g in terms of solid content.

EXAMPLE 12

In the same manner as in Example 1, except that the materials shown in Tables 1 and 3 were used in the amounts shown in Tables 1 and 3, an aqueous emulsion of a self-emulsifiable acryl-urethane copolymer was prepared (the emulsion is hereinafter referred to as EA-12).

EXAMPLE 13

In the dropping tank of a reaction vessel (tank) equipped with a stirrer, a thermometer, a nitrogen-sealing tube, a condenser and a dropping tank were placed 1.0 part of AIBN and 25 parts of MEK and then mixed uniformly. Separately, in the reaction tank were placed 37.3 parts of a mixed polyol of polycarbonatediol having a number average molecular weight of 2,000 obtained from 1,6-hexanediol and diethyl carbonate/polycaprolactonediol having a number average molecular weight of 2,000 obtained using ethylene glycol as an initiator=7/3 (weight ratio) (referred to hereinafter as Polyol F), 1.4 parts of DMBA, 1.0 part of MHE, 1.7 parts of bis-(hydroxymethyl) ketone (referred to hereinafter as HMK), 0.8 part of HEMA, 35.0 parts of MMA, 9.0 parts of BA, 1.0 part of AA, 5.0 parts of DAAA and 25 parts of MEK and then dissolved at 50° C. Subsequently, 7.8 parts of HDI was placed therein and then the resulting mixture was heated to 75° C., and the liquid mixture in the dropping tank was dropped into the reaction tank over 5 hours. The resulting mixture was further subjected simultaneously to urethanization reaction and radical polymerization reaction at the same temperature over 3 hours. After it was confirmed by an infrared absorbance analysis that the isocyanate group was not present in the reaction mixture, 50 parts of IPA and 1.9 parts of TEA were added to the reaction mixture to sufficiently neutralize the same, after which aqueous hydrazide consisting of 149 parts of distilled water and 3.0 parts of ADH was added thereto and the mixture was emulsified. Thereafter, the MEK and the IPA present in the system were removed at 60° C. at 100 Torr to obtain an aqueous emulsion of a self-emulsifiable acryl-urethane copolymer having a solid content of 40.2% (the emulsion is referred to hereinafter as EA-13).

The viscosity of EA-13 was 1,000 mPa·s/25° C., the number average molecular weight of the acryl-urethane copolymer was 28,000, the average particle size was 190 nm, the keto group content was 0.34 mmol/g in terms of solid content and the carboxyl group content was 0.19 mmol/g in terms of solid content.

EXAMPLE 14

In the dropping tank of a reaction vessel (tank) equipped with a stirrer, a thermometer, a nitrogen-sealing tube, a condenser and a dropping tank were placed 13.0 parts of MMA, 7.0 parts of BA, 2.5 parts of AA, 2.5 parts of DAAA, 1.0 part of AIBN, 25 parts of MEK and 25 parts of IPA and then mixed uniformly. Separately, in the reaction tank were placed 37.3 parts of a mixed polyol of polycarbonatediol having a number average molecular weight of 2,000 obtained from 1,6-hexanediol and diethyl carbonate/ polycaprolactonediol having a number average molecular weight of 2,000 obtained using ethylene glycol as initiator= 8/2 (weight ratio) (referred to hereinafter as Polyol H), 1.4 parts of DMBA, 1.0 part of MHE, 1.7 parts of HMK, 0.8 part of HEMA, 13.0 parts of MMA, 7.0 parts of BA, 2.5 parts of AA, 2.5 parts of DAAA, 25 parts of MEK and 25 parts of IPA and then dissolved at 50° C. Subsequently, 7.8 parts of HDI was added thereto and thereafter the resulting mixture was heated to 75° C., and the liquid mixture in the dropping tank was dropped into the reaction tank over 5 hours, after which the resulting mixture was further subjected simultaneously to urethanization reaction and radical polymerization reaction at the same temperature over 3 hours. After it was confirmed by an infrared absorbant analysis that the isocyanate group was not present in the reaction mixture, 6.6 parts of DMEA was added thereto to sufficiently neutralize the same, after which aqueous hydrazide consisting of 235 parts of distilled water and 3.0 parts of ADH was added to the reaction mixture to emulsify the same. Thereafter, the MEK and the IPA present in the system were removed at 60° C. at 13.3 kPa to obtain an aqueous emulsion of a self-emulsifiable acrylurethane copolymer having a solid content of 30.2% (the emulsion is referred to hereinafter as EA-14).

The viscosity of EA-14 was 700 mPa·s/25° C., the number average molecular weight of the acryl-urethane copolymer was 27,000, the average particle size was 40 nm, the keto group content was 0.34 mmol/g in terms of solid content and the carboxyl group content was 0.74 mmol/g.

The synthesis results obtained in Examples 1 to 14 and Comparative Examples 1 to 7 are shown in Tables 1 to 5. Moreover, the storage stability of each aqueous emulsion stored at 25° C. is shown in Table 2, 3 or 5.

Incidentally, in Examples 13 and 14 in Tables 1, 2 and 3, no urethane prepolymer was produced; however, the feeding amount and the like of the urethane component are stated in parentheses for convenience.

In Comparative example 1, when the urethane prepolymer and the ethylenically unsaturated monomers were subjected to radical copolymerization, gelation was caused, so that the subsequent steps were omitted.

When the number average molecular weight of EB-2 in Comparative Example 2 was measured, two molecular weight distributions were obtained, so that the number average molecular weight of each of the distributions is stated. This is considered to be because no mercapto group was present in the system, and hence, the urethane prepolymer was scarcely chain-transferred, so that the copolymer became close to the form of a blend of a acrylic resin with a polyurethane resin.

In Comparative Example 5, a self-emulsifiable acrylic emulsion was produced.

In Comparative Examples 6 and 7, self-emulsifiable urethane emulsions were produced. Incidentally, in Table 4, it is expressed as "urethane prepolymer solution" for convenience.

TABLE 1

| | Example | | | | | | | | | |
|---|---|---|---|---|---|---|---|---|---|---|
| | 1–4 | 5 | 6 | 7 | 8 | 9 | 10 | 11 & 12 | 13 | 14 |
| Long chain polyol (part) | | | | | | | | | | |
| Polyol A | 400 | | | | | | | | | |
| Polyol B | | 400 | | | | | 400 | | | |
| Polyol C | | | | 400 | 400 | | | | | |
| Polyol D | | | | | | 400 | | | | |
| Polyol E | | | | | | | | 400 | | |
| Polyol F | | | | | | | | | (37.3) | |
| Polyol G | | | 400 | | | | | | | |
| Polyol H | | | | | | | | | | (37.3) |

TABLE 1-continued

| | Example | | | | | | | | | |
|---|---|---|---|---|---|---|---|---|---|---|
| | 1–4 | 5 | 6 | 7 | 8 | 9 | 10 | 11 & 12 | 13 | 14 |
| Carboxyl group-containing polyol (part) | | | | | | | | | | |
| DMBA | 14.9 | 14.9 | 14.9 | 26.0 | 44.6 | 27.6 | 44.6 | | (1.4) | (1.4) |
| DMPA | | | | | | | | 13.4 | | |
| Compound having mercapto group and active hydrogen-containing group (part) | | | | | | | | | | |
| MHE | 10.1 | 11.8 | 11.8 | 8.8 | 6.7 | 3.7 | 3.1 | | (1.0) | (1.0) |
| TGL | | 10.8 | 10.8 | | | | | | | |
| MEA | | | | | | | | 15.4 | | |
| Compound having keto group and active hydrogen-containing group (part) | | | | | | | | | | |
| HMK | | 18.0 | 18.0 | 31.5 | 36.0 | 33.5 | 18.0 | | (1.7) | (1.7) |
| Compound having active hydrogen-containing group (part) | | | | | | | | | | |
| HEMA | 9.1 | 6.5 | 6.5 | 2.6 | 4.9 | 1.1 | 2.7 | | (0.8) | (0.8) |
| Organic diisocyanate (part) | | | | | | | | | | |
| HDI | 67.3 | | | | | | | | (7.8) | (7.8) |
| $H_6$-XDI | | | 116.5 | 116.5 | | | 155.4 | 122.4 | | |
| $H_{12}$MDI | | | | 157.4 | 165.3 | | | | | |
| IPDI | | | | | | | | 88.9 | | |
| Urethanizing catalyst (part) | | | | | | | | | | |
| DBTDL | 0.05 | 0.17 | 0.17 | 0.18 | 0.16 | 0.18 | 0.16 | 0.15 | | |
| Neutralizing agent (part) | | | | | | | | | | |
| TEA | | | | | | | | 10.1 | | |
| Organic solvent (part) | | | | | | | | | | |
| MEK | 251 | 289 | 289 | 313 | 329 | 311 | 259 | 254 | | |
| IPA | 251 | 289 | 289 | 313 | 329 | 311 | 259 | 254 | | |
| Urethane prepolymer solution | PA-1 | PA-2 | PA-3 | PA-4 | PA-5 | PA-6 | PA-7 | PA-8 | (PA-9) | (PA-10) |
| Solid content (%) | 50.0 | 50.1 | 50.1 | 49.8 | 49.8 | 50.1 | 50.1 | 49.8 | | |
| Theoretical number average molecular weight from feed | 5,000 | 5,000 | 5,000 | 12,000 | 10,000 | 20,000 | 20,000 | 5,000 | | |
| Keto group content (mmol/g) | | 0.17 | 0.17 | 0.28 | 0.32 | 0.30 | 0.17 | | (0.19) | (0.19) |
| Mercapto group content (mmol/g) | 0.26 | 0.43 | 0.43 | 0.18 | 0.13 | 0.08 | 0.07 | 0.39 | (0.24) | (0.24) |
| Carboxyl group content (mmol/g) | 0.20 | 0.17 | 0.17 | 0.28 | 0.46 | 0.30 | 0.51 | 0.19 | (0.19) | (0.19) |

TABLE 2

| | | Example | | | | | | |
|---|---|---|---|---|---|---|---|---|
| | | 1 | 2 | 3 | 4 | 5 | 6 | 7 |
| Dropping tank | Urethane prepolymer solution (part) | PA-1<br>30.0 | PA-1<br>30.0 | PA-1<br>30.0 | PA-1<br>30.0 | | | |
| | Carboxyl group-containing ethylenically | | | | | | | |

TABLE 2-continued

|  |  | Example | | | | | | |
|---|---|---|---|---|---|---|---|---|
|  |  | 1 | 2 | 3 | 4 | 5 | 6 | 7 |
|  | unsaturated monomer (part) | | | | | | | |
|  | AA | 0.5 | 0.5 | 2.2 | 2.2 | 0.5 | 4.4 | |
|  | Keto group-containing ethylenically unsaturated monomer (part) | | | | | | | |
|  | DAAA | 2.5 | | 2.5 | 2.5 | 2.5 | 5.0 | |
|  | Other ethylenically unsaturated monomer (part) | | | | | | | |
|  | MMA | 22.0 | 22.0 | 15.0 | 15.0 | 10.5 | 22.5 | |
|  | BA | 10.0 | 12.5 | 11.6 | 11.6 | 4.0 | 18.1 | |
|  | EHA | | | | | | | |
|  | AN | | | | | | | |
|  | St | | | 3.8 | 3.8 | 7.5 | | |
|  | CHMA | | | | | | | |
|  | HEMA | | | | | | | |
|  | Radical polymerization initiator (part) | | | | | | | |
|  | AIBN | 1.0 | 1.0 | 1.0 | 1.0 | | | |
|  | BPO | | | | | 1.0 | 1.0 | 0.8 |
|  | Organic solvent part | | | | | | | |
|  | MEK | 25 | 25 | 25 | 25 | 25 | 25 | 15 |
|  | IPA | 25 | 25 | 25 | 25 | 25 | 25 | 15 |
| Reaction tank | Urethane prepolymer solution (part) | PA-1 30.0 | PA-1 30.0 | PA-1 30.0 | PA-1 30.0 | PA-2 100 | PA-3 100 | PA-4 140 |
|  | Carboxyl group-containing ethylenically unsaturated monomer (part) | | | | | | | |
|  | AA | 0.5 | 0.5 | 2.2 | 2.2 | 0.5 | | |
|  | Keto group-containing ethylenically unsaturated monomer (part) | | | | | | | |
|  | DAAA | 2.5 | | 2.5 | 2.5 | 2.5 | | 2.0 |
|  | Other ethylenically unsaturated monomer (part) | | | | | | | |
|  | MMA | 22.0 | 22.0 | 15.0 | 15.0 | 10.5 | | 11.0 |
|  | BA | 10.0 | 12.5 | 11.5 | 11.5 | 4.0 | | |
|  | EHA | | | | | | | |
|  | AN | | | | | | | |
|  | St | | | 3.7 | 3.7 | 7.5 | | |
|  | CHMA | | | | | | | 17.0 |
|  | HEMA | | | | | | | |
|  | Organic solvent part | | | | | | | |
|  | MEK | 10 | 10 | 10 | 10 | | | |
|  | IPA | 10 | 10 | 10 | 10 | | | |
| Neutralizing agent (part) | | | | | | | | |
| TEA | | 2.0 | 2.0 | 6.8 | 6.8 | 2.3 | 7.1 | 2.0 |
| DMEA | | | | | | | | |
| Distilled water (part) | | 149 | 149 | 228 | 228 | 149 | 227 | 149 |
| Polyfunctional hydrazide compound part | | | | | | | | |
| ADH | | 2.6 | 2.6 | 2.6 | | | | 2.7 |
| GDH | | | | | | 3.1 | 3.1 | |
| Aqueous emulsion | | EA-1 | EA-2 | EA-3 | EA-4 | EA-5 | EA-6 | EA-7 |
| Solid content (%) | | 40.1 | 40.0 | 30.1 | 30.0 | 40.0 | 30.0 | 39.7 |
| Viscosity (mPa·s/25° C.) | | 200 | 200 | 300 | 280 | 1,200 | 500 | 1,800 |

TABLE 2-continued

|  | Example | | | | | | |
|---|---|---|---|---|---|---|---|
|  | 1 | 2 | 3 | 4 | 5 | 6 | 7 |
| Number average molecular weight found | 22,000 | 21,000 | 25,000 | 24,000 | 16,000 | 18,000 | 18,000 |
| Average particle size (nm) | 200 | 190 | 75 | 70 | 220 | 40 | 200 |
| Keto group content (mmol/g) | 0.29 |  | 0.29 | 0.29 | 0.38 | 0.38 | 0.31 |
| Carboxyl group content (mmol/g) | 0.20 | 0.20 | 0.67 | 0.67 | 0.22 | 0.69 | 0.20 |
| Storage stability | ○ | ○ | ○ | ○ | ○ | ○ | ○ |

TABLE 3

|  |  | Example | | | | | | |
|---|---|---|---|---|---|---|---|---|
|  |  | 8 | 9 | 10 | 11 | 12 | 13 | 14 |
| Dropping tank | Urethane prepolymer solution (part) |  |  |  |  |  |  |  |
|  | Carboxyl group containing ethylenically unsaturated monomer (part) |  |  |  |  |  |  |  |
|  | AA |  |  |  | 1.0 | 2.5 |  | 2.5 |
|  | Keto group-containing ethylenically unsaturated monomer (part) |  |  |  |  |  |  |  |
|  | DAAA | 2.0 |  |  | 5.0 | 5.0 |  | 2.5 |
|  | Other ethylenically unsaturated monomer (part) |  |  |  |  |  |  |  |
|  | MMA | 8.3 |  |  | 8.0 | 6.5 |  | 13.0 |
|  | BA | 2.7 |  |  | 15.0 | 15.0 |  | 7.0 |
|  | EHA |  |  |  | 1.0 | 1.0 |  |  |
|  | AN |  |  |  | 10.0 | 10.0 |  |  |
|  | st |  |  |  |  |  |  |  |
|  | CHMA | 17.0 |  |  |  |  |  |  |
|  | HEMA |  |  |  | 5.0 | 5.0 |  |  |
|  | Radical polymerization initiator (part) |  |  |  |  |  |  |  |
|  | AIBN |  | 0.5 | 0.5 | 1.0 | 1.0 | 1.0 | 1.0 |
|  | BPO | 0.8 |  |  |  |  |  |  |
|  | Organic solvent (part) |  |  |  |  |  |  |  |
|  | MEK | 15 | 5 | 5 | 25 | 25 | 25 | 25 |
|  | IPA | 15 | 5 | 5 | 25 | 25 |  | 25 |
| Reaction tank | Urethane prepolymer solution (part) | PA-5 140 | PA-6 180 | PA-7 180 | PA-8 20.0 | PA-8 20.0 | (PA-9) (50) | (PA-10) (50) |
|  | Carboxyl group containing ethylenically unsaturated monomer (part) |  |  |  |  |  |  |  |
|  | AA |  |  |  | 1.0 | 2.5 | 1.0 | 2.5 |
|  | Keto group containing ethylenically unsaturated monomer (part) |  |  |  |  |  |  |  |
|  | DAAA |  |  |  | 5.0 | 5.0 | 5.0 | 2.5 |

TABLE 3-continued

| | | Example | | | | | | |
|---|---|---|---|---|---|---|---|---|
| | | 8 | 9 | 10 | 11 | 12 | 13 | 14 |
| Other ethylenically unsaturated monomer (part) | | | | | | | | |
| | MMA | | 10.0 | 9.0 | 8.0 | 6.5 | 35.0 | 13.0 |
| | BA | | | 1.0 | 15.0 | 15.0 | 9.0 | 7.0 |
| | EHA | | | | 1.0 | 1.0 | | |
| | AN | | | | 10.0 | 10.0 | | |
| | St | | | | | | | |
| | CHMA | | | | | | | |
| | HEMA | | | | 5.0 | 5.0 | | |
| Organic solvent (part) | | | | | | | | |
| | MEK | | | | 20 | 20 | 25 | 25 |
| | IPA | | | | 20 | 20 | 50 | 25 |
| Neutralizing agent (part) | | | | | | | | |
| TEA | | 3.2 | 2.7 | | 2.8 | | 1.9 | |
| DMEA | | | | 4.1 | | 6.4 | | 6.6 |
| Distilled water (part) | | 231 | 148 | 234 | 148 | 235 | 149 | 235 |
| Polyfunctional hydrazide compound (part) | | | | | | | | |
| ADH | | 2.9 | 2.3 | 1.3 | | | 3.0 | 3.0 |
| GDH | | | | | 4.7 | 4.7 | | |
| Aqueous emulsion | | EA-8 | EA-9 | EA-10 | EA-11 | EA-12 | EA-13 | EA-14 |
| Solid content (%) | | 29.7 | 40.0 | 30.0 | 39.9 | 29.9 | 40.2 | 30.2 |
| viscosity (mPa·s/25° C.) | | 1,000 | 2,000 | 2,000 | 50 | 100 | 1,000 | 700 |
| Number average molecular weight found | | 18,000 | 16,000 | 21,000 | 29,000 | 30,000 | 28,000 | 27,000 |
| Average particle size (nm) | | 35 | 100 | 30 | 130 | 110 | 190 | 40 |
| Keto group content (mmol/g) | | 0.33 | 0.27 | 0.15 | 0.59 | 0.59 | 0.34 | 0.34 |
| Carboxyl group content (mmol/g) | | 0.32 | 0.27 | 0.46 | 0.30 | 0.71 | 0.19 | 0.74 |
| Storage stability | | ○ | ○ | ○ | ○ | ○ | ○ | ○ |

TABLE 4

| | Comparative Example | | | | |
|---|---|---|---|---|---|
| | 1 | 2 | 3 | 4 | 6 & 7 |
| Long chain polyol (part) | | | | | |
| Polyol A | 400 | 400 | 400 | 400 | |
| Polyol B | | | | | 400 |
| Carboxyl group containing polyol (part) | | | | | |
| DMBA | 14.9 | 14.9 | | | 44.6 |
| Compound having mercapto group and active hydrogen-containing group (part) | | | | | |
| MHE | | | 10.1 | 10.1 | |
| Compound having active hydrogen-containing group (part) | | | | | |
| HEMA | 26.0 | | 9.1 | 9.1 | |
| EtOH | | 9.2 | | | 2.8 |
| Organic diisocyanate (part) | | | | | |
| HDI | 67.3 | 67.3 | 50.5 | 50.5 | 106.0 |
| Urethanizing catalyst (part) | | | | | |
| DBTDL | 0.05 | 0.05 | 0.05 | 0.05 | 0.05 |
| Organic solvent (part) | | | | | |
| MEK | 254 | 246 | 235 | 235 | 235 |
| IPA | 254 | 246 | 235 | 235 | 235 |
| Urethane prepolymer solution | PB-1 | PB-2 | PB-3 | PB-4 | PB-5 |
| Solid content (%) | 50.0 | 49.8 | 49.9 | 50.2 | 50.0 |
| Theoretical number average molecular weight from feed | 5,000 | 5,000 | 5,000 | 5,000 | 20,000 |
| Mercapto group content (mmol/g) | | | 0.28 | 0.28 | |
| Carboxyl group content (mmol/g) | 0.20 | 0.20 | | | 0.53 |

TABLE 5

|  |  | Comparative Example | | | | | | |
|---|---|---|---|---|---|---|---|---|
|  |  | 1 | 2 | 3 | 4 | 5 | 6 | 7 |
| Dropping tank | Urethane prepolymer solution (part) | PB-1 30.0 | PB-2 30.0 | PB-3 30.0 | PB-4 30.0 | | | |
|  | Carboxyl group containing ethylenically unsaturated monomer (part) | | | | | | | |
|  | AA | 0.5 | 0.5 | 2.5 | 3.5 | | | |
|  | Keto group containing ethylenically unsaturated monomer (part) | | | | | | | |
|  | DAAA | 2.5 | 2.5 | 2.5 | 2.5 | | | |
|  | Other ethylenically unsaturated monomer (part) | | | | | | | |
|  | MMA | 22.0 | 22.0 | 20.0 | 19.0 | | | |
|  | BA | 10.0 | 10.0 | 10.0 | 10.0 | | | |
|  | Radical polymerization initiator (part) | | | | | | | |
|  | AIBN | 1.0 | 1.0 | 1.0 | 1.0 | 1.0 | | |
|  | Organic solvent (part) | | | | | | | |
|  | MEK | 25 | 25 | 25 | 25 | 10 | | |
|  | IPA | 25 | 25 | 25 | 25 | 10 | | |
| Reaction tank | Urethane prepolymer solution (part) | PB-1 30.0 | PB-2 30.0 | PB-3 30.0 | PB-4 30.0 | | PB-5 200.0 | PB-5 200.0 |
|  | Carboxyl group containing ethylenically unsaturated monomer (part) | | | | | | | |
|  | AA | 0.5 | 0.5 | 2.5 | 3.5 | 4.4 | | |
|  | Keto group containing ethylenically unsaturated monomer (part) | | | | | | | |
|  | DAAA | 2.5 | 2.5 | 2.5 | 2.5 | 5.0 | | |
|  | Other ethylenically unsaturated monomer (part) | | | | | | | |
|  | MMA | 22.0 | 22.0 | 20.0 | 19.0 | 54.0 | | |
|  | BA | 10.0 | 10.0 | 10.0 | 10.0 | 36.6 | | |
|  | Organic solvent (part) | | | | | | | |
|  | MEK | 10 | 10 | 10 | 10 | 40 | | |
|  | IPA | 10 | 10 | 10 | 10 | 40 | | |
| Neutralizing agent (part) | | | | | | | | |
| TEA | | | 2.0 | 7.0 | 9.8 | 6.2 | 5.3 | 5.3 |
| Distilled water (part) | | | 149 | 144 | 141 | 228 | 228 | 228 |
| Polyfunctional hydrazide compound (part) | | | | | | | | |
| ADH | | | 2.6 | 2.6 | 2.6 | 2.6 | 1.5 | |
| Aqueous emulsion | | (EB-1) | EB-2 | EB-3 | EB-4 | EB-5 | EB-6 | EB-7 |
| Solid content (%) | | | 40.0 | 39.9 | 40.0 | 30.0 | 30.1 | 30.0 |
| Viscosity (mPa · s/25° C.) | | | 1,200 | 1,800 | 2,000 | 80 | 4,000 | 4,000 |
| Number average molecular weight found | | Gelled | 10,000 30,000 | 21,000 | 23,000 | 33,000 | 22,000 | 22,000 |
| Average particle size (nm) | | | 200 | 400 | 120 | 150 | 30 | 30 |

TABLE 5-continued

| | Comparative Example | | | | | | |
|---|---|---|---|---|---|---|---|
| | 1 | 2 | 3 | 4 | 5 | 6 | 7 |
| Keto group content (mmol/g) | | 0.29 | 0.29 | 0.29 | 0.29 | 0.18 | 0.18 |
| Carboxyl group content (mmol/g) | | 0.20 | 0.69 | 0.97 | 0.61 | 0.53 | 0.53 |
| Storage stability | | x | x | ○ | ○ | ○ | ○ |

In Tables 1 to 5,

Polyol A: Polycaprolactonediol (number average molecular weight: 2,000) in which the initiator is ethylene glycol, Polyol B: Polyesterdiol (number average molecular weight: 2,000) obtained from 3-methyl-1,5-pentanediol and adipic acid, Polyol C: Dimer acid type diol (number average molecular weight: 2,000) obtained from dimer acid and 1,6-hexanediol, Polyol D: Polycarbonatediol (number average molecular weight: 1,000) obtained from 1,6-hexanediol and diethyl carbonate, Polyol E: Polyester diol (number average molecular weight: 2,000) obtained from mixed glycol of 1,6-hexanediol/neopentyl glycol=8/2 (mol ratio), Polyol F: Mixed polyol of polycarbonatediol (number average molecular weight: 2,000) obtained from 1,6-hexanediol and diethyl carbonate/polycaprolactonediol (number average molecular weight: 2,000) in which the initiator is ethylene glycol=7/3 (weight ratio), Polyol G: Polyesterdiol (number average molecular weight: 2,000) obtained from mixed glycol of ethylene glycol/neopentyl glycol=8/2 (mol ratio) and mixed dicarboxylic acid of adipic acid/isophthalic acid=5/5 (mol ratio), Polyol H: Mixed polyol of polycarbonatediol (number average molecular weight: 2,000) obtained from 1,6-hexanediol and diethyl carbonate/polycaprolactonediol (number average molecular weight: 2,000) in which the initiator is ethylene glycol=8/2 (weight ratio), DMBA: Dimethylolbutanoic acid,
DMPA: Dimethylolpropionic acid,
MHE: 2-Mercapto-1-hydroxyethane,
TGL: Thioglycerol,
MEA: β-Mercaptoethylamine,
HMK: Bis(hydroxymethyl) ketone,
HEMA: 2-Hydroxyethyl methacrylate,
EtOH: Ethanol,
HDI: Hexamethylene diisocyanate,
$H_6$-XDI: Hydrogenated xylylene diisocyanate,
$H_{12}$-MDI: Hydrogenated diphenylmethane diisocyanate,
IPDI: Isophorone diisocyanate,
DBTDL: Dibutyltin dilaurate,
TEA: Triethylamine,
DMEA: N,N-Dimethylethylamine,
MEK: Methyl ethyl ketone,
IPA: Isopropanol,
MMA: Methyl methacrylate,
BA: n-Butyl acrylate,
AA: Acrylic acid,
EHA: 2-Ethylhexyl acrylate,
AN: Acrylonitrile,
St: Styrene,
CHMA: Cyclohexyl methacrylate,
DAAA: Diacetoneacrylamide,
AIBN: 2,2'-Azobis-2-isobutyronitrile
BPO: Benzoyl peroxide,
ADH: Adipic acid dihydrazide,
GDH: Glutaric acid dihydrazide.

Storage Stability:

Storage conditions: 25° C.×3 months, stored in dark.

○: Phase separation, precipitation and the like were not caused and the emulsion was in the uniform state.

x: Phase separation, precipitation and the like were caused.

Coating Film Evaluation—1

EXAMPLE 15

To EA-1 was added Kyowanol M (film-forming adjuvant manufactured by KYOWA HAKKO KOGYO CO., LTD.) in an amount of 15 parts per 100 parts of the total solid content to prepare an aqueous clear paint (referred to hereinafter as AP-1). This paint was coated on a white soft steel plate by a bar coater so that the dried film thickness became 30 to 40 µm and thereafter cured at 25° C. for 14 days to obtain a coating sample, after which the solvent resistance (xylene rubbing test) of the sample was evaluated. The results obtained are shown in Table 6.

Xylene rubbing test: Coating surface was rubbed 30 strokes with absorbent cotton impregnated with xylene and then the appearance was evaluated.

AP-1 was poured on a removable paper laminated to a glass plate so that the dry thickness became about 100 µm and cured under the conditions of 25° C. and 2 weeks to prepare a clear film. This film was sunk in water at 25° C. for 1 week and then the water absorbability of this film was measured. The results obtained are shown in Table 6.

EXAMPLES 16 TO 21 AND COMPARATIVE EXAMPLES 8 TO 10

In the same manner as in Example 15, except that EA-2, 5, 7, 9, 11 or 13 or EB-2, 3 or 4 was substituted for the EA-1, aqueous clear paints (referred to hereinafter as AP-2 to AP-7 and BP-1 to BP-3, respectively) were prepared, and subjected to measurement of solvent resistance and water absorbability in the same manner as in Example 15. The results obtained are shown in Table 6.

TABLE 6

| Example | Aqueous clear paint | Solvent resistance | Water absorbability |
|---|---|---|---|
| 15 | AP-1 | ○ | 19 |
| 16 | AP-2 | ○ | 21 |
| 17 | AP-3 | ○ | 12 |
| 18 | AP-4 | ○ | 6 |
| 19 | AP-5 | ○ | 18 |
| 20 | AP-6 | ○ | 14 |
| 21 | AP-7 | ○ | 7 |
| Comparative Example | | | |
| 8 | BP-1 | x | 27 |
| 9 | BP-2 | ○ | 35 |
| 10 | BP-3 | ○ | 61 |

In Table 6,
Solvent Resistance
○: Change of appearance was hardly confirmed.
x: Changes of appearance such as whitening, scratch and the like were found.
Water Absorption
Calculated by the following equation, and the smaller the value, the better the water resistance:

Water absorption (%)=[(weight of film after immersion)−(weight of film before immersion)]/(weight of film before immersion)×100

Coating Film Evaluation—2

EXAMPLE 22

The following paint components were placed in a sand grinding mill and dispersed for 1 hour to prepare an aqueous paint (referred to hereinafter as AP-8). The formulation of paint components was as follows:

| AP-8 formulation | |
|---|---|
| EA-1 | 640 parts |
| Titanium oxide paste | 335 parts |
| Film-forming adjuvant (Kyowanol M, a trade name of KYOWA HAKKO KOGYO CO., LTD.) | 25 parts |

*Titanium oxide paste formulations:

| | |
|---|---|
| Titanium oxide (Taipaque R-630, a trade name of ISHIHARA SANGYO CO., LTD.) | 700 parts |
| Water | 177 parts |
| Surfactant (25% Newco 1723 aq manufactured by Nippon Emulsifier Co., Ltd.) | 84 parts |
| Dispersing agent (SMA-1440H, a trade name of Arco Chemical Company) | 20 parts |
| Defoaming agent (Adekanate B-187, a trade name of ASAHI DENKA KOGYO CO., LTD.) | 12 parts |
| Ammonia water | 6 parts |
| Antiseptic (Proxel BDN manufactured by Zeneca Co., Ltd.) | 1 part |

A test piece was prepared using this PA-8 and subjected to measurement of various physical properties of coating film. The measurement items were as follows and the results obtained are shown in Table 7.

Thermal shock test (defined in JIS A6909-1995) 60° Specular gloss (defined in JIS K5660-1995) Haze (defined in the Instrument Handling Method. The measurement method is substantially in accordance with the 60° specular gloss measuring method.)

* Thermal shock test

Test piece: A test piece was prepared by the method defined in JIS A6909-1995. Incidentally, the constitution of each coating composition is as follows: Undercoating material and principal material are coated by the methods specified by makers. In addition, AP-8 was applied by spray coating.

Undercoat material: Elastic primer (manufactured by Asia Industry Co., Ltd.).

Principal material: Elasticity Altone main material (manufactured by Asia Industry Co., Ltd.).

Topcoating material: AP-8

* 60° Specular gloss and haze

Test piece: A test piece was prepared by the method defined in JIS K5660-1995, provided that the drying conditions were 25° C.×14 days.

Measuring machine: Haze-gloss reflectometer (manufactured by BYK-Gardner GmbH)

EXAMPLES 23 TO 28 AND COMPARATIVE EXAMPLES 11 TO 13

In the same manner as in Example 22, except that EA-2, 5, 7, 9, 11 or 13 or EB-2, 3 or 4 was substituted for the EA-1, an aqueous paint was prepared (referred to hereinafter as AP-9, 10, 11, 12, 13 or 14 or BP-4, 5 or 6, respectively) and subjected to the same test as in Example 22. The results obtained are shown in Table 7.

TABLE 7

| | Aqueous paint | Thermal shock test | Gloss | Haze |
|---|---|---|---|---|
| Example | | | | |
| 22 | AP-8 | ○ | 79 | 45 |
| 23 | AP-9 | Δ | 80 | 44 |
| 24 | AP-10 | ○ | 76 | 42 |
| 25 | AP-11 | ○ | 81 | 41 |
| 26 | AP-12 | ○ | 85 | 38 |
| 27 | AP-13 | ○ | 87 | 50 |
| 28 | AP-14 | ○ | 77 | 42 |
| Comparative Example | | | | |
| 11 | BP-4 | x | 48 | 100 |
| 12 | BP-5 | ○ | 63 | 80 |
| 13 | BP-6 | ○ | 76 | 50 |

In Table 7, evaluation was made based on the following criterion:
Thermal Shock Test
○: On the surface of the test piece, none of peel, crack, blister, remarkable discoloration and gloss deterioration were found.
Δ: On the surface of the test piece, peel, crack, blister, remarkable discoloration and gloss deterioration were slightly found.
x: On the surface of the test piece, peel, crack, blister, remarkable discoloration and gloss deterioration were considerably found.

Gloss

The larger the value, the better.

Haze

The smaller the value, the better.

Evaluation of Printing Ink

EXAMPLE 29

EA-3, pigment and solvent were blended in the amounts shown below in a stout container, and glass beads (diameter: 1 to 1.5 mm) were placed in the container in the same amount as the total of the amounts of the above three components blended and then dispersed by a paint shaker for 3 hours to form an ink, thereby obtaining an aqueous ink. This aqueous ink was subjected to evaluation of pigment dispersibility, adhesiveness and alcohol resistance. The results obtained are shown in Table 8.

| Ink formulation | |
|---|---|
| EA-3 (as solid content) | 18.0 parts |
| Phthalocyanine blue | 12.0 parts |
| Water | 65.0 parts |
| IPA | 5.0 parts. |

(1) Pigment Dispersibility

Using fineness gauge (25 μm), the aqueous ink prepared was poured into the groove of the fineness gauge, and drawn by a scraper over about 1 second, and the scale of the position was read in which the densely aggregated grains began to appear, whereby the pigment dispersibility was evaluated. Incidentally, the judgement of "the position in which densely aggregated grains began to appear" was in accordance with the method of measuring dispersibility using the distribution chart method of JIS K-5400 (1990).

Evaluation

⊙: Less than 5 μm

○: Not less than 5 μm but less than 15 μm

Δ: Not less than 15 μm but less than 25 μm x: Not less than 25 μm.

(2) Redissovability

The aqueous ink was printed on a tinplate sheet by bar coater No. 4, and after 1, 2, 3 and 5 minutes from the coating, a washing liquid was applied to the ink-coated surface, and the redissovability of the aqueous ink was evaluated.

Evaluation

⊙: The ink was dissolved even when 5 minutes had elapsed after the coating. (Run down).

○: The ink was not dissolved when 5 minutes had elapsed after the coating, but was dissolved 3 minutes after the coating.

Δ: The ink was not dissolved when 3 minutes had elapsed after the coating, but was dissolved 2 minutes after the coating.

x: The ink was not dissolved 1 minute after the coating.

(3) Adhesiveness

The aqueous ink was coated on the discharge-treated surface of a corona-discharge-treated, oriented polypropylene film having a thickness of 15 μm, the discharge-treated surface of a corona discharge-treated polyethylene terephthalate film having a thickness of 15 μm or the discharge-treated surface of a corona discharge-treated nylon film having a thickness of 15 μm using bar coater No. 4 and after the coated film was allowed to stand for one day, a Cellophane tape was applied to the printed surface and quickly peeled.

Evaluation

⊙: At least 90% of the printed film was left.

○: Not less than 70% but less than 90% of the printed film was left.

Δ: Not less than 50% but less than 70% of the printed film was left.

x: Only less than 50% of the printed film was left.

(4) Alcohol Resistance

The aqueous ink was coated on the discharge-treated surface of a corona discharge-treated polyethylene terephthalate film having a thickness of 15 μm using bar coater No. 4 and after the coated film was allowed to stand for one day, the coated surface was rubbed with absorbent cotton impregnated with ethanol and the alcohol resistance was evaluated by the number of strokes until the base film was exposed.

Evaluation

⊙: At least 20 strokes.

○: Not less than 10 strokes but less than 20 strokes.

Δ: Note less than 5 strokes but less than 10 strokes.

x: Less than 5 strokes.

EXAMPLES 30 TO 35 AND COMPARATIVE EXAMPLES 14 TO 17

In the same manner as in Example 29, except that the EA-3 was replaced with EA-4, 6, 8, 10, 12 or 14 or EB-2, 5, 6 or 7, aqueous inks were prepared and evaluated in the same manner. The results obtained are shown in Table 8.

TABLE 8

| | | Aqueous emulsion | Pigment dispersibility | Redissovability | Adhesiveness | | | Alcohol resistance |
|---|---|---|---|---|---|---|---|---|
| | | | | | OPP | PET | NY | |
| Example | 29 | EA-3 | ⊙ | ⊙ | ⊙ | ○ | ○ | ⊙ |
| | 30 | EA-4 | ⊙ | ⊙ | ○ | ○ | ○ | ○ |
| | 31 | EA-6 | ⊙ | ⊙ | ⊙ | ⊙ | ⊙ | ⊙ |
| | 32 | EA-8 | ○ | ○ | ○ | ⊙ | ⊙ | ○ |
| | 33 | EA-10 | ○ | ○ | ○ | ⊙ | ⊙ | ○ |
| | 34 | EA-12 | ⊙ | ⊙ | ⊙ | ○ | ○ | ⊙ |
| | 35 | EA-14 | ⊙ | ⊙ | ○ | ○ | ○ | ⊙ |
| Comparative Example | 14 | EB-2 | x | Δ | Δ | x | x | ○ |
| | 15 | EB-5 | Δ | Δ | Δ | x | x | ⊙ |
| | 16 | EB-6 | Δ | x | x | Δ | Δ | ○ |
| | 17 | EB-7 | Δ | x | x | Δ | Δ | x |

In Table 8,

OPP: Corona discharge-treated polypropylene film.

PET: Corona discharge-treated polyethylene terephthalate film.

NY: Corona discharge-treated nylon film.

What is claimed is:

1. An aqueous emulsion which comprises as a resin component a self-emulsifiable copolymer in which
   (i) at least one ethylenically unsaturated monomer and
   (ii) at least one urethane prepolymer having a mercapto group, a hydrophilic, polar group and a keto group or an aldehyde group; or at least one urethane prepolymer having a mercapto group, a hydrophilic, polar group, an ethylenically unsaturated double bond and a keto group or an aldehyde group are bonded by radical polymerization.

2. An aqueous emulsion which comprises as a resin component a self-emulsifiable copolymer in which (i) at least one ethylenically unsaturated monomer having a hydrophilic, polar group or a mixture of said ethylenically unsaturated monomer having a hydrophilic, polar group with at least one other ethylenically unsaturated monomer and (ii) at least one urethane prepolymer having a mercapto group, a hydrophilic, polar group and a keto group or an aldehyde group; or at least one urethane prepolymer having a mercapto group, a hydrophilic, polar group, an ethylenically unsaturated double bond and a keto group or an aldehyde group are bonded by radical polymerization.

3. An aqueous emulsion which comprises as a resin component a self-emulsifiable copolymer in which (i) at least one ethylenically unsaturated monomer having a keto group or an aldehyde group or a mixture of said ethylenically unsaturated monomer having a keto group or an aldehyde group with at least one other ethylenically unsaturated monomer and (ii) at least one urethane prepolymer having a mercapto group, a hydrophilic, polar group and a keto group or an aldehyde group; or at least one urethane prepolymer having a mercapto group, a hydrophilic, polar group, an ethylenically unsaturated double bond and a keto group or an aldehyde group are bonded by radical polymerization.

4. An aqueous emulsion which is composed of (I) a aqueous emulsion which comprises as a resin component a self-emulsifiable copolymer in which (i) at least one ethylenically unsaturated monomer having a keto group or an aldehyde group or a mixture of said ethylenically unsaturated monomer having a keto group or an aldehyde group with at least one other ethylenically unsaturated monomer and (ii) at least one urethane prepolymer having at least one mercato group and at least one hydrophilic, polar group are bonded by radical polymerization, and (II) at least one polyfunctional hydrazide compound.

5. An aqueous emulsion which is composed of (I) an aqueous emulsion which comprises as a resin component a self-emulsifiable copolymer in which (i) at least one ethylenically unsaturated monomer having a keto group or an aldehyde group or a mixture of said ethylenically unsaturated monomer having a keto group or an aldehyde group with at least one other ethylenically unsaturated monomer and (ii) at least one urethane prepolymer having an ethylenically unsaturated double bond, a mercato group and a hydrophilic, polar group are bonded by radical polymerization, and (II) at least one polyfunctional hydrazide compound.

6. An aqueous emulsion which is composed of the aqueous emulsion according to claim 1 and at least one polyfunctional hydrazide compound.

7. An aqueous emulsion which is composed of the aqueous emulsion according to claim 2 and at least one polyfunctional hydrazide compound.

8. An aqueous emulsion which is composed of the aqueous emulsion according to claim 3 and at least one polyfunctional hydrazide compound.

* * * * *